(12) United States Patent
Ward

(10) Patent No.: US 9,446,748 B2
(45) Date of Patent: Sep. 20, 2016

(54) PORTABLE ANTILOCK BRAKE SYSTEM

(76) Inventor: Gregory A Ward, Pasadena, CA (US)

( * ) Notice: Subject to any disclaimer, the term of this patent is extended or adjusted under 35 U.S.C. 154(b) by 681 days.

(21) Appl. No.: 13/572,409

(22) Filed: Aug. 10, 2012

(65) Prior Publication Data

US 2012/0305345 A1    Dec. 6, 2012

Related U.S. Application Data

(63) Continuation-in-part of application No. 12/841,473, filed on Jul. 22, 2010, now abandoned.

(60) Provisional application No. 61/325,237, filed on Apr. 16, 2010.

(51) Int. Cl.
| | |
|---|---|
| *F16D 65/28* | (2006.01) |
| *B60T 8/42* | (2006.01) |
| *B60T 8/17* | (2006.01) |
| *B60T 8/32* | (2006.01) |
| *B60T 8/54* | (2006.01) |
| *B60T 13/74* | (2006.01) |
| *B60T 8/40* | (2006.01) |

(52) U.S. Cl.
CPC ............ *B60T 8/4208* (2013.01); *B60T 8/1706* (2013.01); *B60T 8/32* (2013.01); *B60T 8/329* (2013.01); *B60T 8/3295* (2013.01); *B60T 8/4009* (2013.01); *B60T 8/4216* (2013.01); *B60T 8/54* (2013.01); *B60T 13/746* (2013.01)

(58) Field of Classification Search
CPC .................. F16D 2125/32; F16D 2125/28
USPC ...... 188/72.4, 72.8, 72.9, 156; 303/6 C, 121, 303/126
See application file for complete search history.

(56) References Cited

U.S. PATENT DOCUMENTS

| | | | | | |
|---|---|---|---|---|---|
| 3,361,487 | A | * | 1/1968 | Vriend ........................... | 303/61 |
| 3,942,844 | A | * | 3/1976 | Inada et al. ............. | 303/122.13 |
| 4,354,715 | A | * | 10/1982 | Farr et al. .................. | 303/116.4 |
| 4,372,620 | A | * | 2/1983 | Mekosh, Jr. .................. | 303/127 |
| 4,536,041 | A | * | 8/1985 | Kosolapov et al. ........ | 303/116.3 |
| 4,755,007 | A | * | 7/1988 | Mollat ............................ | 303/61 |
| 4,875,741 | A | * | 10/1989 | Ozawa et al. ............. | 303/116.4 |
| 4,962,972 | A | * | 10/1990 | Pizzo .......................... | 303/116.4 |
| 5,042,885 | A | * | 8/1991 | Villec ........................... | 303/144 |
| 5,302,011 | A | * | 4/1994 | Volz et al. .................. | 303/116.1 |

(Continued)

FOREIGN PATENT DOCUMENTS

GB           2415232 A   * 12/2005    .............. B60T 11/12

*Primary Examiner* — Robert A Siconolfi
*Assistant Examiner* — Mahbubur Rashid
(74) *Attorney, Agent, or Firm* — Cotman IP Law Group, PLC

(57) ABSTRACT

An electronic antiskid brake assembly with a portable power source that can retrofit onto a working manual brake system to provide antiskid capabilities without effecting the manual brake system's normal operation. The antiskid system can be applied anywhere on a brake linkage. When a force is applied to a brake pad, an electronic controller utilizes detects a skidding event, and then automatically powers on an actuator. The actuator moves a brake linkage to create a pulse mode on the brake linkage. The pulse mode modulates the force that is applied to the brake pad. A one way cylinder can be included with a manual hydraulic brake system to provide a mechanical means for generating pulse mode on the brake linkage. The power source can move with the brake linkage so that the actuator pulses the brake linkage a small amount, while the brake linkage applies full braking.

17 Claims, 18 Drawing Sheets

(56) References Cited

U.S. PATENT DOCUMENTS

| | | | |
|---|---|---|---|
| 6,070,951 A * | 6/2000 | Nakazawa | 303/113.2 |
| 6,703,716 B2 * | 3/2004 | Chiu | B62J 6/00 |
| | | | 290/1 R |
| 6,896,106 B2 * | 5/2005 | Kramer | 188/71.7 |
| 7,048,546 B2 * | 5/2006 | Endo | B62J 6/12 |
| | | | 439/16 |
| 2005/0039989 A1 * | 2/2005 | Huang | B60T 8/3225 |
| | | | 188/26 |
| 2005/0161295 A1 * | 7/2005 | Nilsson et al. | 188/158 |
| 2005/0252733 A1 * | 11/2005 | Cannata | B60T 17/02 |
| | | | 188/72.7 |
| 2006/0278477 A1 * | 12/2006 | Balz et al. | 188/156 |
| 2008/0111342 A1 * | 5/2008 | Niekerk | B60T 8/1706 |
| | | | 280/261 |

\* cited by examiner

Figure 2A - (Prior Art)
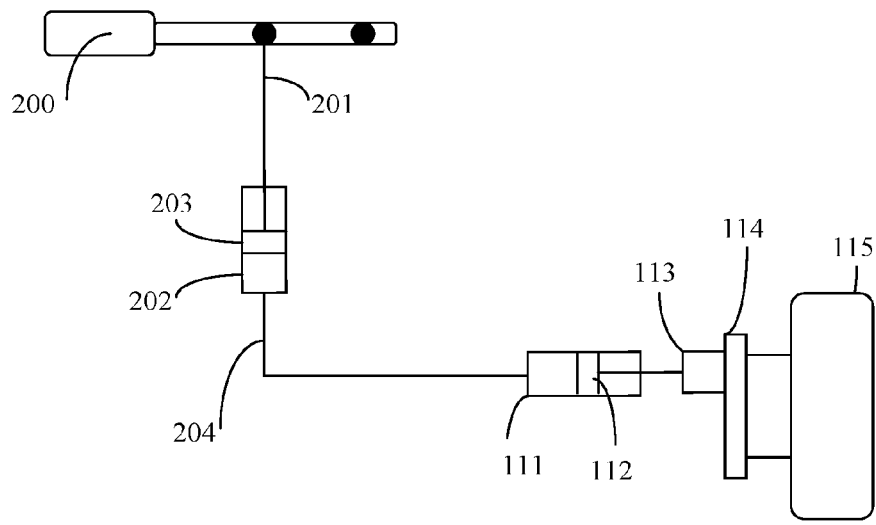
Figure 2B – (Prior Art)
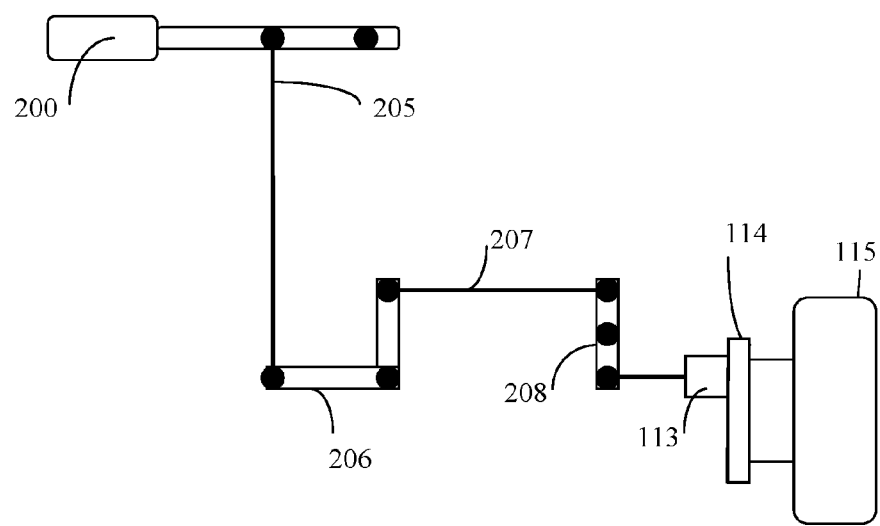

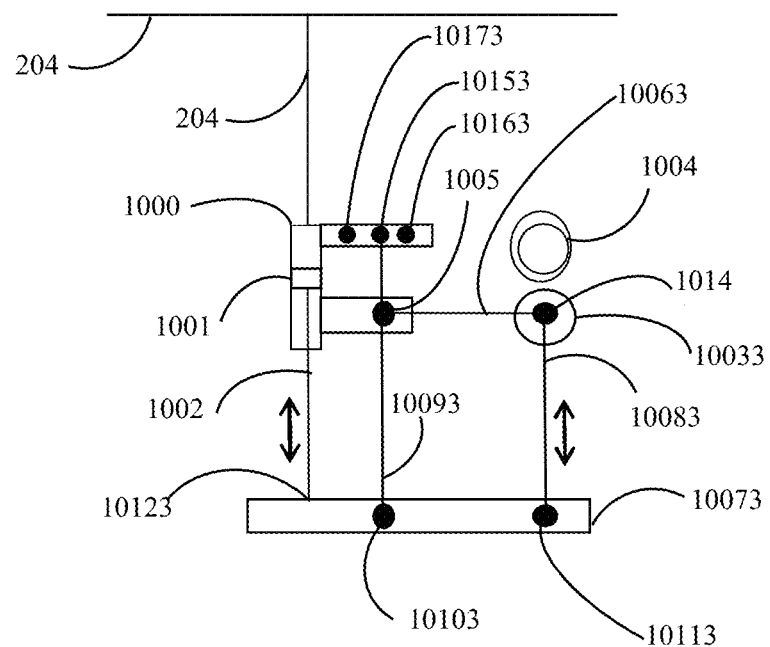

US 9,446,748 B2

PORTABLE ANTILOCK BRAKE SYSTEM

CROSS-REFERENCE TO RELATED APPLICATIONS

The present continuation-in-part patent application claims priority benefit under 35 U.S.C. 120 of the U.S. nonprovisional patent application for patent application Ser. No. 12/841,473 now abandoned entitled "An Apparatus and a System for Mitigating Wheel Skidding In a Manual Brake System", filed on 22 Jul. 2010, which further claims priority to U.S. provisional application for patent Ser. No. 61/325,237 and entitled "Antiskid System For General Aviation Aircraft", filed on 16 Apr. 2010 under 35 U.S.C. 119(e). The contents of these related patent application(s) are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to brake systems. More particularly, one or more embodiments of the invention relate to a pulsing antiskid brake system.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Electronic controlled antiskid systems may be found on many wheeled vehicles including, but not limited to, most cars, large airplanes and some motorcycles. These vehicles typically have powered hydraulic or pneumatic brake systems that work in conjunction with the antiskid system. These electronic controlled antiskid systems generally use wheel speed sensors, an electronic controller and control valves to regulate the brake pressure in the powered brake systems to reduce tire skids. These electronic controlled antiskid systems can increase safety by improving directional control and shortening the stopping distance of the vehicle by reducing tire skids when braking. These electronic controlled antiskid systems are also referred to as Antilock Brake Systems (ABS).

Manual brake systems typically use the force from an operator's feet and/or hands to provide the energy to actuate and power hydraulic or mechanical brakes. These vehicles generally do not have powered hydraulic or pneumatic brakes. Examples of wheeled vehicles with manual brakes include, without limitation, general aviation aircraft, motorcycles, and bicycles. Although there are a large number of vehicles with manual brakes that may benefit from an electronic controlled antiskid system, to date it is believed that there are few if any practical electronic controlled antiskid systems available for these vehicles. Many electronic controlled antiskid systems in use today on wheeled vehicles require a powered hydraulic or pneumatic brake system for their operation. Power for these brake systems is generally provided from a hydraulic or pneumatic pump coupled to the vehicle's engine or an electric motor that its powered by the vehicle's electrical system.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. FIG. 1 is a schematic diagram showing a powered hydraulic brake system with an electronic controlled antiskid system for an aircraft with two main wheels 115, in accordance with the prior art. Hydraulic fluid is directed from a reservoir 100 to a hydraulic pump 102 via a hydraulic pipe 101. Pump 102 is driven by a vehicle engine 103 or an electric motor 104 that is powered by the vehicle's electrical system. Hydraulic fluid is directed from pump 102 through a hydraulic pipe 105 to a relief valve 106 that ensures that the maximum hydraulic system pressure is not exceeded. The hydraulic fluid is directed to left and right metering valves 108 through hydraulic pipes 107.

An aircraft brake system allows the pilot to apply the brakes independently to left and right main wheels 115 by pressing on left and right brake pedals 109. Left and right brake pedals 109 are connected to their respective metering valves 108. When the pilot pushes on brake pedals 109, metering valves 108 modulate the pressure of the hydraulic fluid through pipes 110 to brake cylinders 111. Brake pistons 112 inside brake cylinders 111 are connected to brake pads 113. When the pilot pushes on brake pedals 109, brake cylinders 111 cause brake pads 113 to push against brake discs/drums 114 creating the friction to slow the turning brake discs/drums 114 that are connected to wheels 115. This action slows or stops the aircraft. A back up system is required for some vehicles so they can be stopped if there is a loss of power to the brake system. On a powered hydraulic brake system, this can be accomplished by adding a hydraulic accumulator 124 to the brake system.

The electronic controlled antiskid system needs to monitor the rotation of wheels 115 to determine when a skid is occurring or about to occur. This is done with wheel speed sensors 116 located at each wheel 115. A tone ring 117 turns with wheel 115 and creates a magnetic field disruption that can be detected by wheel speed sensors 116. Wheel speed sensor 116 and tone ring 117 are typically integrated into a single unit and located inside the axle on large aircraft. The wheel speed signals are sent to an electronic controller 119 using electrical cables 118. Using the speeds from wheel speed sensors 116, electronic controller 119 determines when a skid condition is occurring and sends a signal to required control valves 122 through electrical cables 120 to reduce the brake pressure. Hydraulic fluid is released from brake cylinders 111 through pipes 121, through control valves 122 and through pipes 123 back to reservoir 100. When controller 119 determines that the skid event is over, it commands required control valves 122 to close, and the brake system returns to its normal braking mode.

FIGS. 2A and 2B illustrate manual brake systems, according to the prior art. FIG. 2A is a schematic diagram showing a manual hydraulic brake system for a general aviation aircraft, and FIG. 2B is a schematic diagram showing a manual mechanical brake system for a motorcycle or bicycle. Manual brake systems use the force from the operator's feet and/or hands to provide the energy to actuate and power the hydraulic or mechanical brakes. Manual hydraulic brake systems are common on general aviation aircraft, motorcycles, and bicycles. These vehicles do not have powered hydraulic or pneumatic brakes. These vehicles use a separate hand or foot lever for each wheel that has a brake.

Referring to FIG. 2A, a manual hydraulic brake system for a right main wheel 115 is shown for a general aviation (GA) aircraft. There is also a duplicate manual hydraulic brake system for the left main wheel on the GA aircraft. The pilot provides the power for the actuation of the brakes by pushing on a brake pedal 200 with his foot. Brake pedal 200 is coupled to an input shaft 201 that is inserted into a hydraulic master cylinder 202. Input shaft 201 is connected to a master cylinder piston 203 located inside master cylinder 202. When the pilot pushes on brake pedal 200, hydraulic fluid is moved out of master cylinder 202 and into a brake pipe 204 that is connected to a brake cylinder 111. Fluid in brake pipe 204 is pushed into brake cylinder 111 thus moving a brake piston 112. Brake piston 112 is connected to a brake pad 113, which is pushed against a brake disc/drum 114 creating the friction to slow the turning brake disc/drum 114 that is connected to wheel 115. This action slows or stops the aircraft.

Manual mechanical brake systems are common on motorcycles and bicycles. These vehicles use a separate hand and/or foot lever for the front and rear wheels, which each have a brake. Referring to FIG. 2B, a manual mechanical brake system for a motorcycle or bicycle is shown. Only the brake system for the rear wheel is shown. There is normally a manual mechanical brake system for the front wheel as well on motorcycles and bicycles. The vehicle operator provides the power for the actuation of the brakes by pushing or pulling on a brake lever 200 with his hand and/or foot. Brake lever 200 is coupled to a mechanical lever 206 with a rod or cable 205. When the operator pushes or pulls on brake lever 200, mechanical lever 206 pulls or pushes on a rod or cable 207 that is connected to a mechanical lever 208 that is connected to a brake pad 113, which is pushed against a brake disc/drum 114 creating the friction to slow the turning brake disc/drum 114 that is connected to a wheel 115. This action slows or stops the vehicle. The number and arrangement of rods, cables and levers in different manual mechanical brake systems varies depending on the geometry of the vehicle.

Hybrid manual brake systems exist that combine hydraulic and mechanical linkages to couple the operator's hand and/or foot movements to operate and power the brake mechanism. The brake pads in these hybrid manual brake systems can be mechanically or hydraulically actuated.

By way of educational background, another aspect of the prior art generally useful to be aware of is that there are currently known electronically controlled antiskid systems for manual hydraulic brake systems for motorcycles. As illustrated by way of example in FIG. 1, it is believed that today's electronically controlled antiskid systems are not well suited for vehicles with manual brakes since a power source for the brake system must be added to the vehicle. Due to the added weight and cost and the difficulty of mounting the many needed components, one may expect that an electronically controlled antiskid system is typically not practical for these types of vehicles. There are some currently known mechanical antiskid devices, not systems, for bicycles with manual brakes. However, it is believed that these mechanical devices offer reduced antiskid performance when compared to electronically controlled antiskid devices.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A and 2B illustrate manual brake systems, according to the prior art. FIG. 2A is a schematic diagram showing a manual hydraulic brake system for a general aviation aircraft, and FIG. 2B is a schematic diagram showing a manual mechanical brake system for a motorcycle or bicycle;

FIG. 3A is an overall view of a simple hydraulic system with three alternate locations for a lock and release assembly and an actuator assembly, and FIG. 3B is a close-up view of a fourth alternate location for the lock and release assembly and the actuator assembly in the simple hydraulic system. FIG. 3C is an overall view of a more complex mechanical system with six alternate locations for the lock and release assembly and the actuator assembly;

FIG. 4A shows the electronic control as an On/Off switch, and FIG. 4B shows the electronic control with the addition of a rheostat;

FIG. 6A shows a piston. FIG. 6B shows a bellows actuator. FIG. 6C shows an inflatable accumulator. FIG. 6D shows a motor with a screw. FIG. 6E shows the motor with helical gears. FIG. 6F shows the motor with a worm gear. FIG. 6G shows the motor with a gear and a gear rack. FIG. 6H shows the motor with scissor arms. FIG. 6I shows the motor with a cam. FIG. 6J shows the motor with a lever arm. FIG. 6K shows an electric solenoid;

FIG. 7A shows a locking tab method. FIG. 7B shows a locking clamp method. FIG. 7C shows a wire lock method. FIG. 7D shows a tapered wedge method. FIG. 7E shows a dual cam lock method. FIG. 7F shows a strap clamp method. FIG. 7G shows a locking collar method. FIG. 7H shows an external fork method. FIG. 7I shows an iron particle method, and FIG. 7J shows a hydraulic piston method;

FIGS. 10A, 10B and 10C are schematic diagrams showing an exemplary manual hydraulic brake system, in accordance with an embodiment of the present invention. FIG. 10A is an overall view of the hydraulic system comprising a cylinder that is added to a hydraulic brake line in order to pulse the brakes. FIG. 10B is a close-up view of one method for varying the distance that a piston may be moved. FIG. 10C is a close up view of how the range of motion of the piston can be changed from full movement to zero movement.

Unless otherwise indicated illustrations in the figures are not necessarily drawn to scale.

Figure 12A:
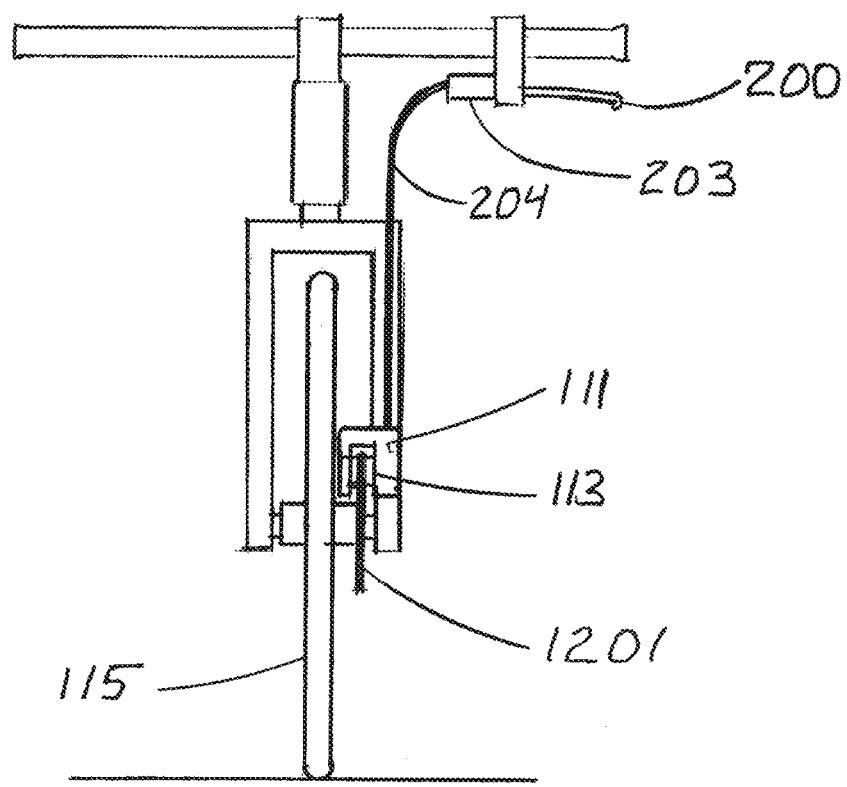

FIG. 12A is an illustration of the frontal view of a bicycle with a hydraulic disc brake system.

Figure 12B:
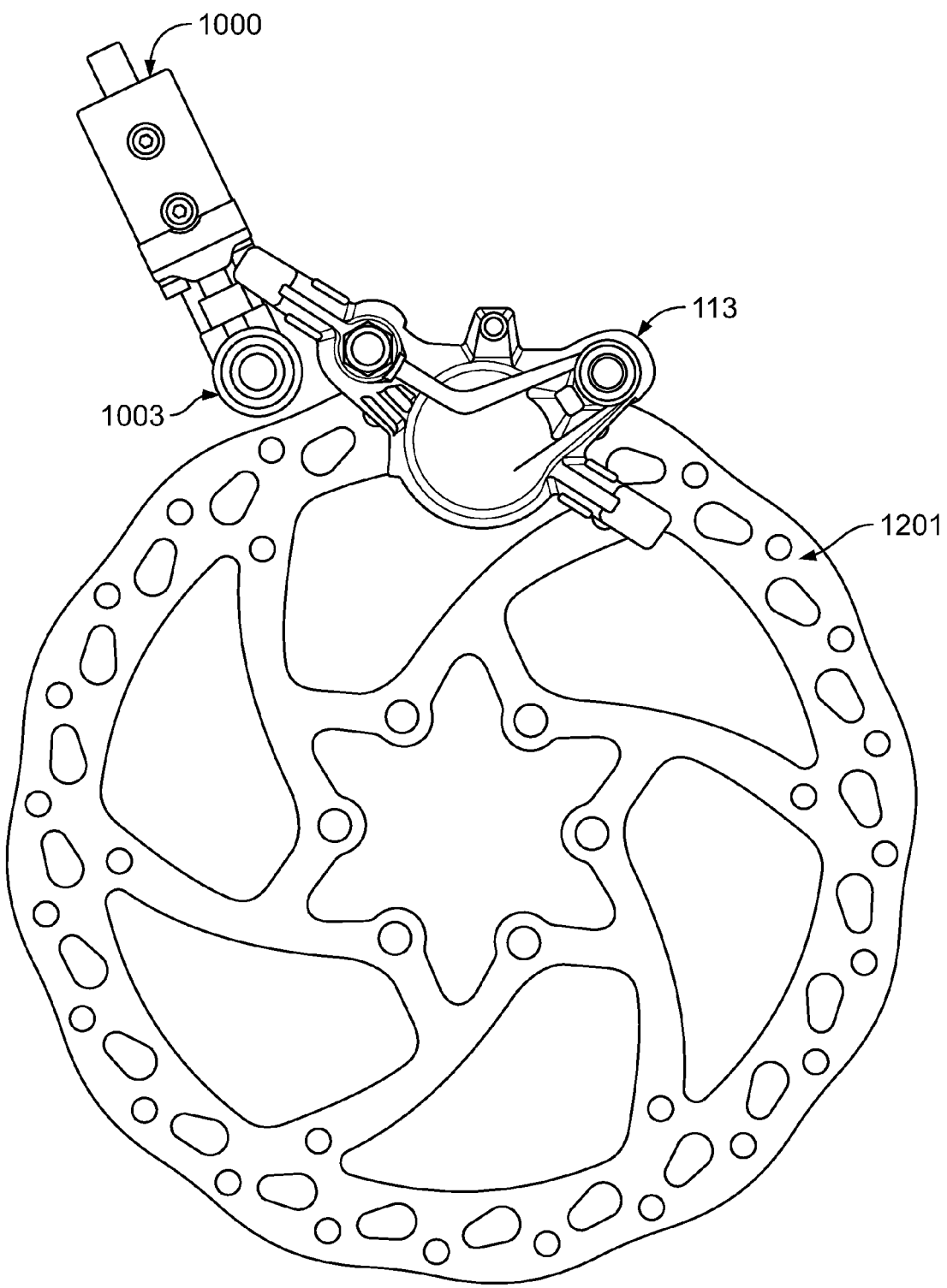

FIG. 12B is an illustration of the side view of a hydraulic disc brake system of a bicycle coupled with the anti-skid system in accordance with one or more embodiments of the present invention.

Figure 12C:
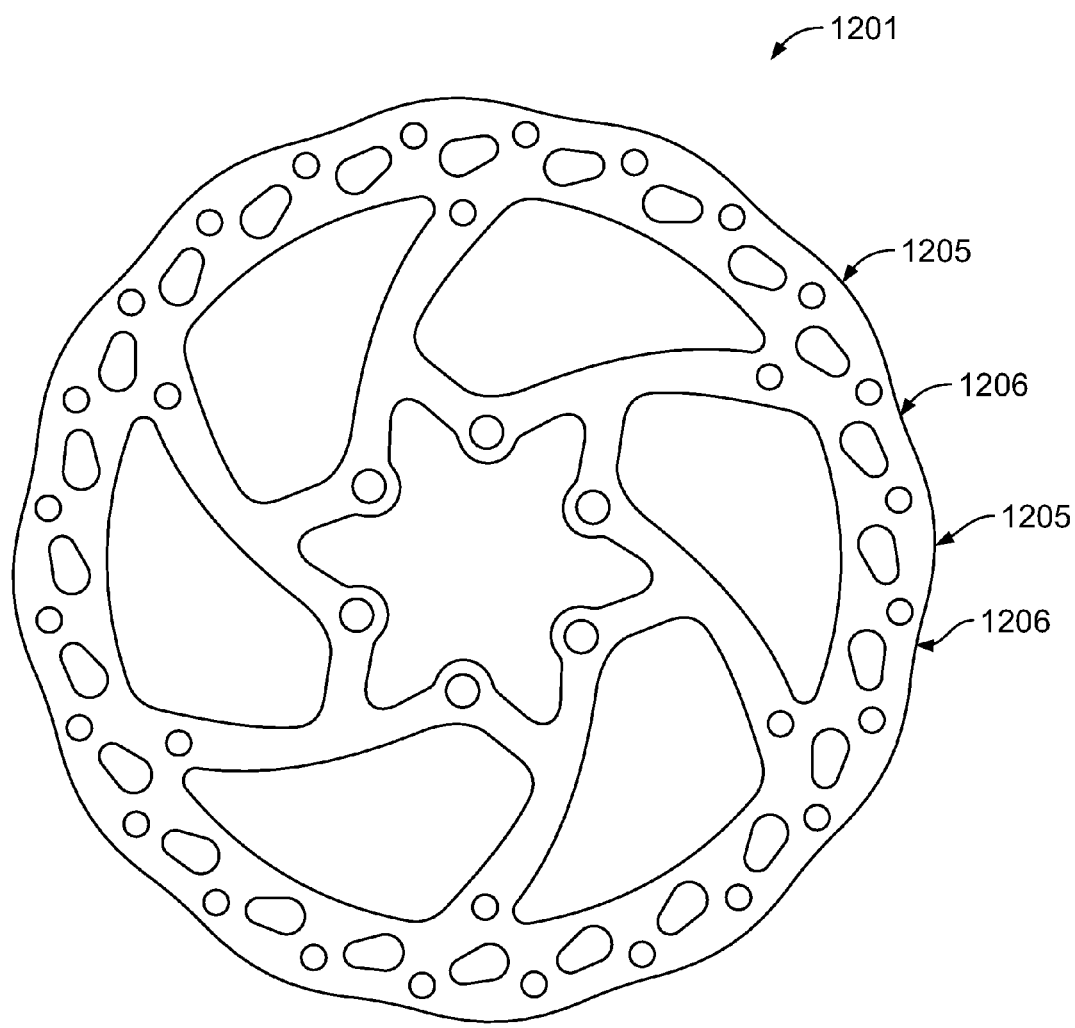

FIG. 12C is an illustration of the side view of a disc brake rotor showing the circumferential high-low segments forming the integrated cam for the anti-skid system in accordance with one or more embodiments of the present invention.

Figure 12D:
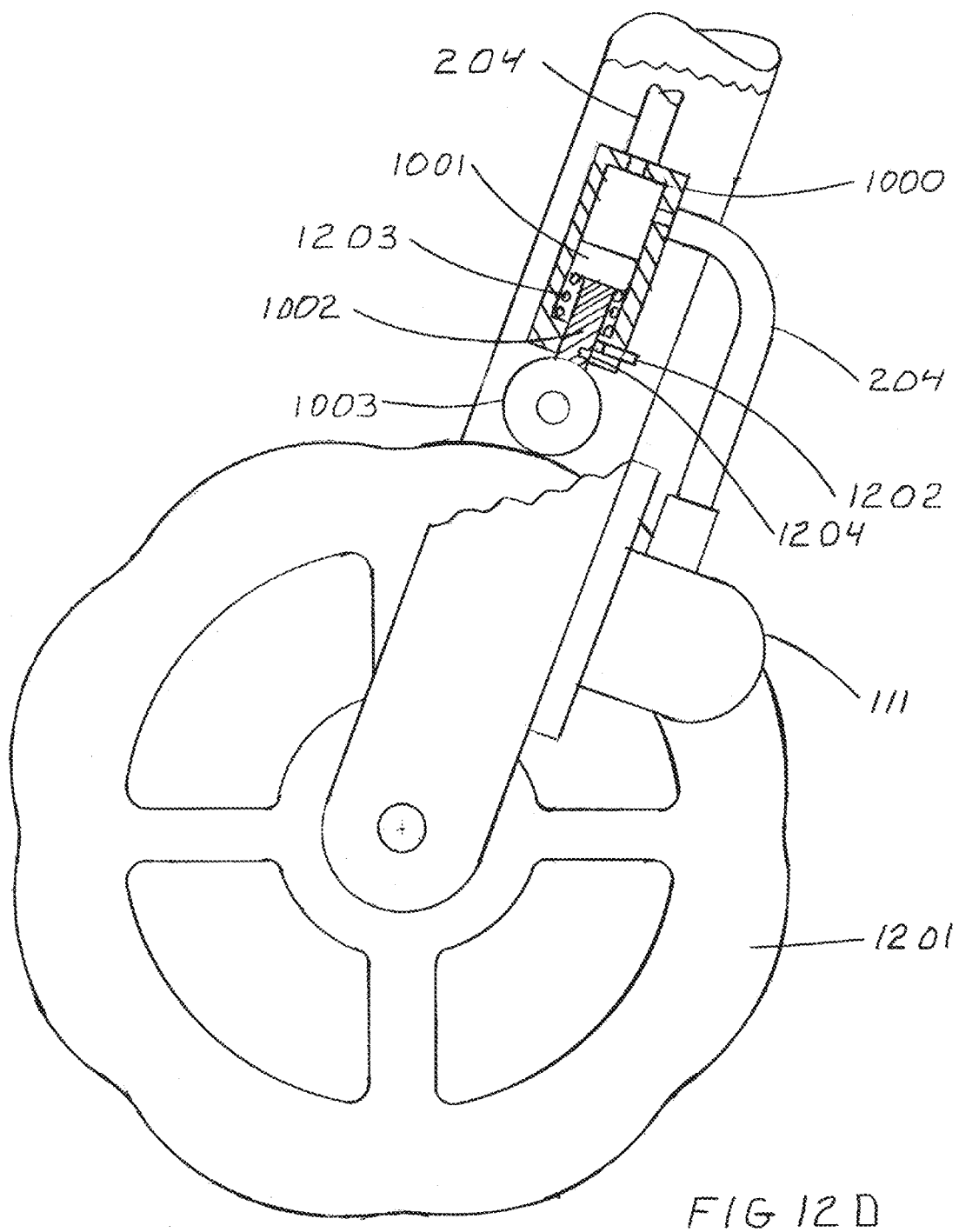

FIG. 12D is a breakout illustration of the side view of a hydraulic disc brake system of a bicycle showing internal components of the anti-skid system in accordance with one or more embodiments of the present invention.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

At least some preferred embodiments of the present invention provide an electronically controlled antiskid system for wheeled vehicles with manual brakes to increase safety by improving directional control and shortening the stopping distance by reducing tire skids while braking when compared to conventional manual brake systems. At least some preferred embodiments are used with manual brake systems where the vehicle's operator uses their hands and/or feet to actuate and power the mechanical or hydraulic brakes. At least some preferred embodiments do not use any hydraulic or pneumatic power to apply the brakes. Instead, at least some preferred embodiments use an electronic controller and a wheel speed sensor to detect a tire skidding event on a wheeled vehicle and command an actuator to move the brake linkage to reduce the brake force that the operator is applying to the brake pads of the skidding wheel and thus reduce the tire skids. In at least some preferred embodiments, electrical power from the vehicles' electrical system is used to power the antiskid system, including the actuators. At least some preferred embodiments can operate on either DC or AC power. In addition, some embodiments can operate on portable battery power, which is ideal for bicycle applications that have no on-board electrical systems.

Figure 1:
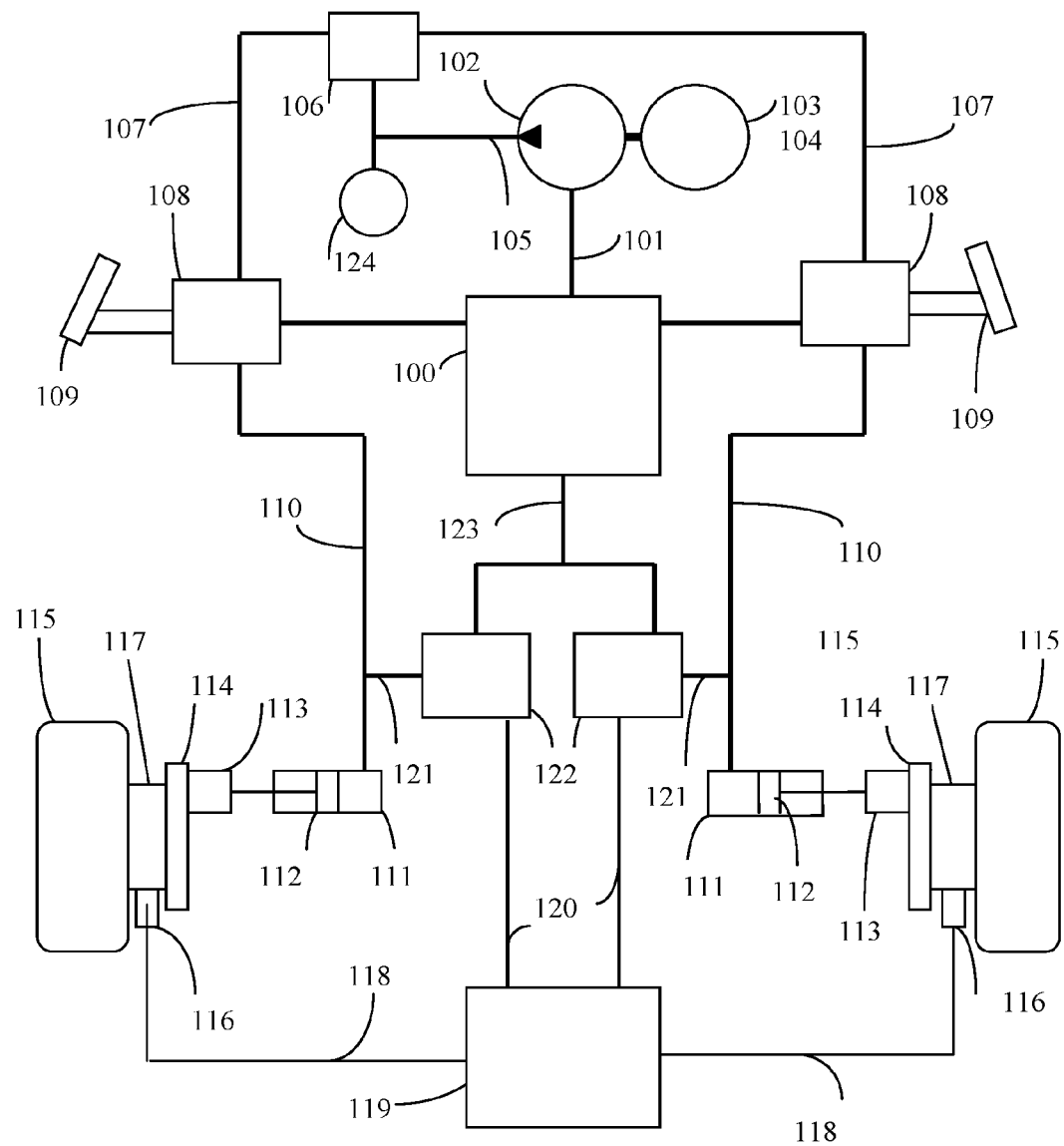
FIG. 1 is a schematic diagram showing a powered hydraulic brake system with an electronic controlled antiskid system for an aircraft with two main wheels, in accordance with the prior art.

As illustrated by way of example in FIG. 1, today's electronically controlled antiskid systems are not well suited for vehicles with manual brakes because a power source for the brake system must be added to the vehicle. This is not practical due to the added weight, cost and the difficulty of mounting the many needed components. At least some preferred embodiments of the present invention provide the same safety benefits for vehicles with manual brake systems without the need for all of the additional components required for a vehicle with powered brakes. Antiskid systems according to at least some preferred embodiments weigh and cost less and are more compact than antiskid systems for powered brakes since there is no need for a hydraulic or pneumatic pump, a drive motor, control valves, relief valves and piping. In at least some preferred embodiments, the actuator that moves the brake linkage can be located anywhere in the brake linkage system. This can reduce the cost of retrofitting the antiskid system into vehicles already in use. At least some preferred embodiments may also reduce maintenance costs by extending tire life by reducing tire skids and tire blowouts and may reduce the cost of vehicle insurance by reducing the number of accidents caused by loss of directional control when braking Those skilled in the art, in light of the present teachings will recognize that the antiskid brake system may include a failsafe design whereby the antiskid brake system may continue to be operable even when the actuator and an ABS power source become inoperative.

In typical use of at least some preferred embodiments, the manual brake system already in place and certified on a vehicle is not impacted by the addition of the antiskid system. All elements of a manual brake system, shown by way of example in FIGS. 2A and 2B, remain operational on the vehicle when the electronically controlled antiskid system is not operating. This is important for aircraft where re-certifying the entire brake system is impractical due to the added cost and the need to comply with the most current certification requirements. At least some preferred embodiments can be retrofit on vehicles already in operation or may be installed in new production vehicles as they are being manufactured. In some cases, a retrofit can be performed by replacing the current master cylinder with a plug and play replacement called an electric master cylinder.

In at least some preferred embodiments, the electronic controller of the antiskid system for manual brakes can be adapted from electronic controllers for antiskid systems for powered brakes. This includes both analog and digital controller designs that are available today. In addition, antiskid software algorithms for powered brake systems can also be adapted to be used in at least some preferred embodiments. Adapting current antiskid electronics and software for the electronic controller in at least some preferred embodiments is attractive to perspective manufacturers in the antiskid brake business as it can reduce both the development time and cost to manufacture.

Most currently known antiskid controllers compare the wheel speeds of all of the wheels on the vehicle to determine if a skidding event is occurring or about to occur with one or more of the wheels. Some electronic controllers use software algorithms to estimate the vehicle's "reference" or ground speed. Other antiskid controllers use inputs from other systems on board the vehicle to determine the estimated ground or reference speed. A function that can be added to some embodiments of the present invention is a Global Positioning System (GPS) capability that calculates the ground speed of the vehicle using GPS satellite data.

At least some preferred embodiments of the present invention may be implemented with an advanced controller for aircraft and motorcycles applications or a basic controller sufficient for bicycle applications. For example, without limitation, a simple version of the electronic controller may be used on off road bicycles when a cyclist needs to maintain maximum braking and directional control when riding down a step dirt hill. In this non-limiting example, the electronic controller is an ON/OFF switch that the cyclist holds "ON" to engage the antiskid actuator in a "pulse the brakes mode" when the antiskid function is needed.

At least some preferred embodiments of the present invention may utilize either type of automotive wheel speed sensors: the variable-reluctance or the magneto-resistive type of sensor. These sensors are environmentally rugged, lightweight, compact and low cost, and magneto-resistive wheel speed sensors can operate down to zero wheel speeds.

Furthermore, wheel speed sensors in at least some preferred embodiments are not mounted inside the axle of the wheel. Wheel speed sensors typically use a gear shaped device called a tone ring to disrupt the magnetic field around the wheel speed sensor. Aircraft wheel speed sensors integrate the tone rings with the sensor into a single unit that is mounted inside the aircraft's axle. This is not practical on general aviation aircraft due to the small axle diameters. The wheel speed sensor used in at least some preferred embodiments is located outside the axle. In some embodiments, the integrated brake disk and the tone ring also mount outside the axle. In addition in at least some preferred embodiments, the tone ring can be integrated into the brake disc for vehicles that utilize a disc brake. This is done by forming a gear shape in the outside or inside diameter of the brake disc. This can be done on aircraft, motorcycles or bicycles and can reduce weight and system complexity.

There are several groups of people that could benefit from an electronically controlled antiskid system for vehicles with manual brakes in accordance with at least some preferred embodiments of the present invention. Pilots of general aviation (GA) aircraft can utilize at least some preferred embodiments to increase safety and reduce operating costs. The landing phase of flight has the highest accident rate and loss of direction control is the biggest accident factor in this category. Having an antiskid system available for GA aircraft pilots could improve aircraft safety and increase pilots' peace of mind. Flight schools may also be interested in having the antiskid function according to at least some preferred embodiments on their GA aircraft since they typically experience two blown tires a year per aircraft from excessive braking by students. Manufacturers of GA aircraft with manual brake systems may also be interested in at least some preferred embodiments, as they could create more sales. With at least some preferred embodiments, manufacturers of aircraft brakes and antiskid systems would be able to enter the untapped retrofit market with over 200,000 GA airplanes flying today with manual brakes and no antiskid system available for these aircraft. Motorcycle manufactures may be interested in at least some preferred embodiments for motorcycles with manual brakes as many motorcycle manufacturers continue to provide more safety features on their vehicles, similar to cars to promote safety and increase sales. At least some preferred embodiments would be particularly beneficial for motorcycles that are operated in wet or icy conditions. With at least some preferred embodiments manufacturers of motorcycle brakes would also be able to enter the untapped retrofit market with millions of motorcycles in use today with manual brakes and no antiskid system available for these vehicles. Bicycle manufactures may be interested in at least some preferred embodiments for bicycles operated in wet and icy conditions and for bicycles operated by off-road cyclists that need enhanced skid and directional control when riding their bicycles in the dirt or mud. With at least some preferred embodiments manufacturers of bicycle brakes would be able to enter the untapped retrofit market with millions of bicycles in use today with manual brakes and no antiskid system available for these vehicles.

In a basic embodiment of the present invention, an antiskid system uses an actuator assembly to move a brake linkage to reduce the force that an operator is applying to a brake pad. The actuator assembly that moves the brake linkage utilizes a pulsing motion to reduce the average force that is being applied to the brake pad to reduce or eliminate tire skid. In this basic embodiment, the antiskid system also uses an electronic controller that is an On/Off switch that is actuated by the vehicle's operator to turn on the actuator assembly that pulses the manual brake linkage to reduce or eliminate tire skid. A typical application this embodiment is on a bicycle.

In an advanced embodiment of the present invention, an antiskid system uses an actuator assembly that can set and hold a position of a manual brake linkage to modulate the force on a brake pad. Wheel speed sensors and optional GPS data are used by an electronic controller to detect a skidding event. When a skidding event is detected, the electronic controller automatically commands the actuator to modulate the brake force to reduce tire skid. This advanced embodiment provides more efficient antiskid protection than a basic embodiment. A typical application for the present embodiment is on GA aircraft and motorcycles.

Figure 3A:
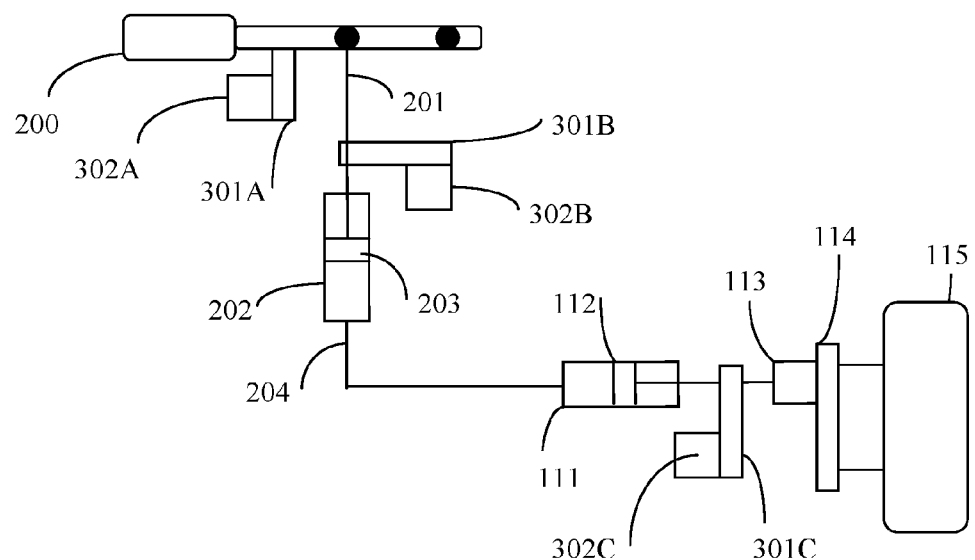
FIGS. 3A, 3B and 3C are schematic diagrams showing an exemplary manual brake system for one wheel on a vehicle, in accordance with an embodiment of the present invention.
Figure 3B:
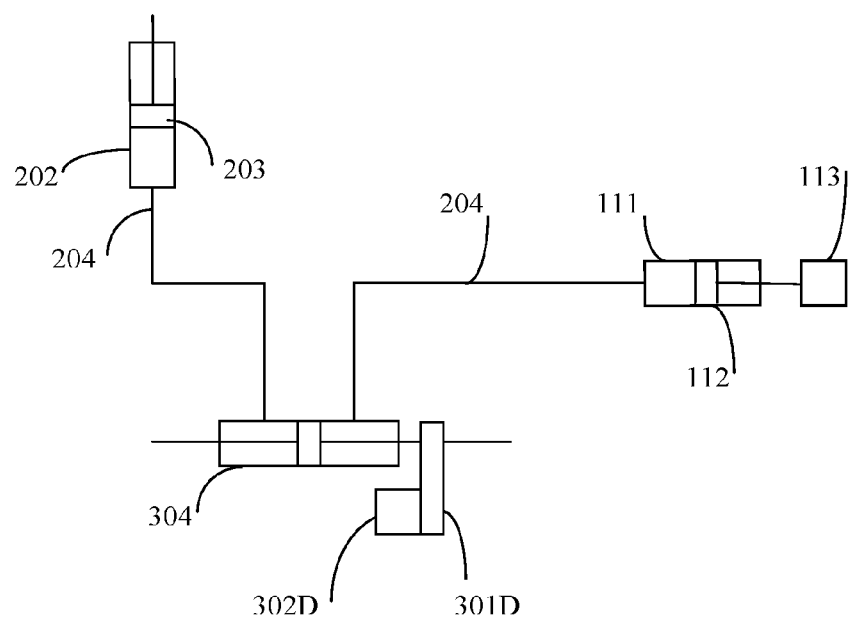
Figure 3C:
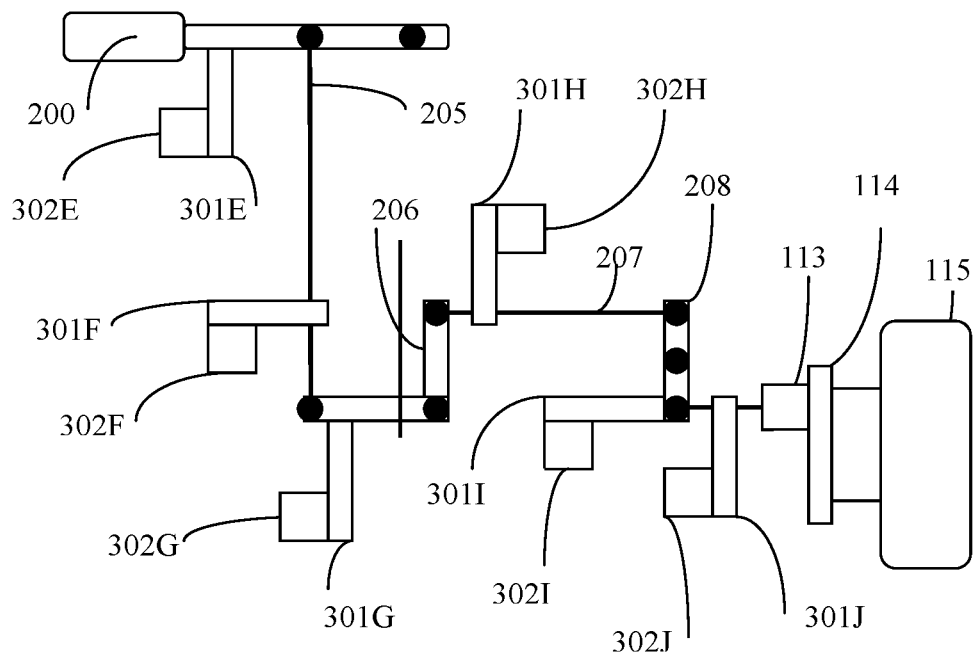

FIGS. 3A, 3B and 3C are schematic diagrams showing an exemplary manual brake system for one wheel on a vehicle, in accordance with an embodiment of the present invention. FIG. 3A is an overall view of a simple hydraulic system with three alternate locations for a lock and release assembly and an actuator assembly, and FIG. 3B is a close-up view of a fourth alternate location for the lock and release assembly and the actuator assembly in the simple hydraulic system. FIG. 3C is an overall view of a more complex mechanical system with six alternate locations for the lock and release assembly and the actuator assembly. The present embodiment may be used on vehicles with two main wheels each with a separate brake and an independent hand or foot brake lever that is used by an operator to actuate and power the brakes. The wheels may be located in the front and rear of these vehicles such as in motorcycles and bicycles, or they may be located on the left and right side of these vehicles such as in GA aircraft.

Referring to FIG. 3A, the brake system uses the force applied to a brake lever 200 by the operator's hand or foot to create the hydraulic brake pressure. Hydraulic pressure is created by transferring the force from the operator's hand or foot to brake lever 200 to an input shaft 201 that is connected to a piston 203 in a hydraulic master cylinder 202. Hydraulic piston 203 is contained in a cavity within master cylinder 202 in such a manner that hydraulic pressure is created in proportion to the force applied to brake lever 200 by the operator's hand or foot. A hydraulic pipe 204 connects master cylinder 202 to a hydraulic brake cylinder 111. Hydraulic brake cylinder 111 comprises a brake piston 112 that is connected to a brake pad 113, which is pushed against a brake disc/drum 114 creating the friction to slow the turning disc/drum 114 that is connected to a wheel 115. This action slows and stops the vehicle.

In the present embodiment, the antiskid system comprises a lock and release assembly, an actuator assembly and an electronic controller. The actuator assembly may comprise a gearmotor and pulses the brake linkage to reduce the average force on the brake pads. The lock and release assembly connects the actuator assembly to the brake linkage when the antiskid function is needed and disconnects the actuator assembly from the brake linkage when the antiskid function is not needed or if there is a loss of electrical power. There is a lock and release assembly for each actuator assembly. The actuator assembly and the lock and release assembly can be powered by the vehicle's electrical system or by a portable battery. The lock and release assembly and the actuator assembly can be located in several positions throughout the manual hydraulic brake linkage system. For example without limitation, a lock and release assembly 301A and an actuator assembly 302A are shown mounted at brake lever 200, a lock and release assembly 301B and an actuator assembly 302B are shown mounted near input shaft 201, and a lock and release assembly 301C and an actuator assembly 302C are shown mounted near brake pad 113.

Referring to FIG. 3B, a fourth exemplary location of a lock and release assembly 301D and an actuator assembly 302D is shown mounted in hydraulic piping 204 using a hydraulic cylinder 304. Lock and release assembly 301D may be located anywhere along hydraulic piping 204. In some hydraulic brake system there is limited access to the mechanical linkage. When this is the case, a hydraulic cylinder 304 can be placed any convenient location in the brake line 204 as shown in FIG. 3B. The shaft on the hydraulic cylinder 304 provides a mechanical linkage for connecting actuator assembly 302D and lock and release assembly 301D.

In the present embodiment, the electronic controller used on the manual hydraulic and mechanical brake system is an On/Off Switch that is actuated by the vehicle's operator to turn on actuator assembly 302A, 302B, 302C, or 302D that pulses the manual brake linkage to reduce or eliminate tire skids. The switch also turns on lock and release assembly 301A, 301B, 301C, or 301D to connect actuator assembly 302A, 302B, 302C, or 302D to the brake linkage. A typical application for an electronic controlled antiskid system utilizing an On/Off switch is on a bicycle.

In an alternate embodiment, the system comprises an actuator assembly with a gearmotor that pulses the brake linkage to reduce the average force on the brake pads without a lock and release assembly. There may be an actuator assembly for one or both wheels. The actuator assembly may be powered by the vehicle's electrical system or by a portable battery. The lock and release assembly may be eliminated when the configuration of the brake linkage enables the actuator assembly to engage and disengage the brake linkage without the need for a connection device. This is the case on some bicycle brake systems where the actuator assembly moves the scissor type brake linkages at the brake pads or when the actuator assembly moves the brake handle. When there is no lock and release assembly, a position switch may be required to turn off the actuator assembly at its most retracted position.

Referring to FIG. 3C, the manual mechanical brake system for a motorcycle or bicycle is shown. These vehicles have two main wheels each with a separate brake and an independent hand or foot brake levers that are used by the operator to actuate and power the brakes. Only the brake system for the rear wheel is shown; although, there may also be a manual mechanical brake system for the front wheel on motorcycles and bicycles.

In the present embodiment, the vehicle operator provides the power for the actuation of the brakes by pushing or pulling on brake lever 200 with his hand or foot. Brake lever 200 is coupled to a mechanical lever 206 with a rod or cable 205. When the operator pushes or pulls on brake lever 200, mechanical lever 206 pulls or pushes rod or cable 207 that is connected to a mechanical lever 208 that is connected to brake pad 113 by a rod or cable 207. Brake pad 113 is pushed against brake disc/drum 114 creating the friction to slow the turning brake disc/drum 114 that is connected to wheel 115. This action slows or stops the vehicle. In alternate embodiments the number and arrangement of rods, cables and levers may vary depending on the particular geometry of the vehicle.

In the present embodiment, a lock and release assembly, an actuator assembly and an electronic controller is added to the manual mechanical brake system. As in the simple system, the lock and release assembly and the actuator assembly can be located in several positions throughout the manual mechanical brake linkage system. For example, without limitation, a lock and release assembly 301E and an actuator assembly 302E are shown mounted near brake lever 200, a lock and release assembly 301F and an actuator assembly 302F are shown mounted along rod or cable 205, a lock and release assembly 301G and an actuator assembly 302G are shown mounted on mechanical lever 206, a lock and release assembly 301H and an actuator assembly 302H are shown mounted along rod or cable 207, a lock and release assembly 301I and an actuator assembly 302I are shown mounted on mechanical lever 208, and a lock and release assembly 301J and an actuator assembly 302J are shown mounted near brake pad 113.

Hybrid manual brake systems exist that combine hydraulic and mechanical linkages to couple the operator's hand and/or foot movements to operate and power the brake mechanism. The brake pads in these hybrid manual brake systems can be mechanically or hydraulically actuated. In alternate embodiments the features and functions described above for the manual hydraulic and manual mechanical brake systems can be used in their respective locations in these hybrid systems.

Figure 4A:
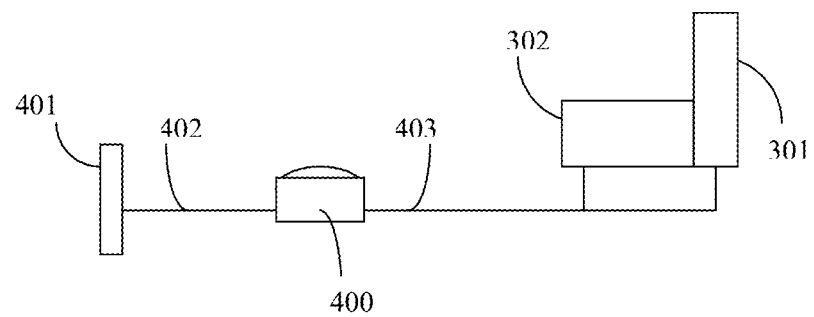
FIGS. 4A and 4B are schematic diagrams illustrating an exemplary electronic controller for an antiskid system for manual brakes, in accordance with an embodiment of the present invention.
Figure 4B:
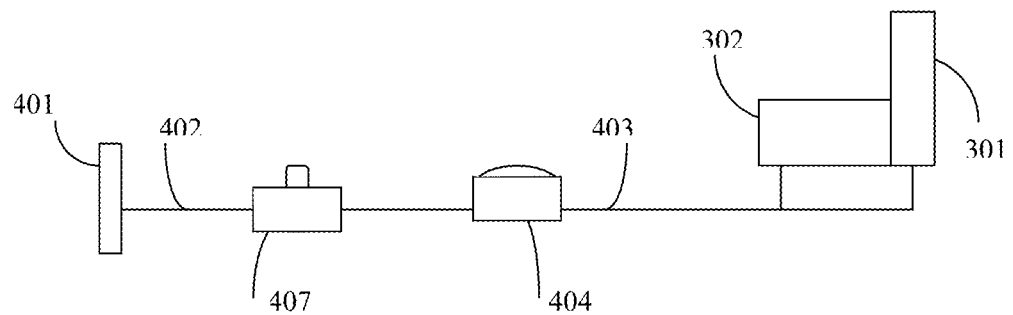

FIGS. 4A and 4B are schematic diagrams illustrating an exemplary electronic controller for an antiskid system for manual brakes, in accordance with an embodiment of the present invention. FIG. 4A shows the electronic control as an On/Off switch 400, and FIG. 4B shows the electronic control with the addition of a rheostat 407. Referring to FIG. 4A, an electricity source 401 is connected to On/Off switch 400 by an electrical cable 402. Electricity source 401 may be various different types of electricity sources such as, but not limited to, a vehicle power source, batteries, etc. On/Off switch 400 supplies a lock and release assembly 301 and an actuator assembly 302 with electrical power through an electrical cable 403. When an operator closes On/Off switch 400, lock and release assembly 301 connects to the brake linkage and actuator assembly 302 pulses the brakes. When the operator opens On/Off switch 400, actuator assembly 302 stops pulsing the brakes and lock and release assembly 301 disconnects from the brake linkage.

In alternate embodiments the functionality of the electronic controller may be increased by replacing On/Off Switch 400 with other types of switches. One alternate embodiment comprises a force switch that is mounted in the brake linkage and closes when a specific brake force is reached. This turns on the actuator assembly and the lock and release assembly connecting the actuator assembly to the brake linkage. When the brake force drops below a specific level, the force switch opens and the actuator assembly stops pulsing the brakes and the lock and release assembly disconnects from the brake linkage. In this embodiment, a separate force switch is required for each actuator assembly.

In another alternate embodiment, a pressure switch is mounted in the hydraulic circuit and closes when a specific brake pressure is reached. This turns on the actuator assembly and the lock and release assembly connecting the actuator assembly to the brake linkage. When the brake pressure drops below a specific level, the pressure switch opens and the actuator assembly stops pulsing the brakes and the lock and release assembly disconnects from the brake linkage. The pressure switch only works with manual hydraulic brake systems. In this embodiment, a separate pressure switch is needed for each actuator assembly.

In another alternate embodiment, an inertia switch is mounted to the vehicle and closes when a specific deceleration level is reached. This switch turns on the actuator assembly and the lock and release assembly connecting the actuator assembly to the brake linkage. When the vehicle's deceleration drops below a specific level, the inertia switch opens and the actuator assembly stops pulsing the brakes and the lock and release assembly disconnects from the brake linkage. Only one inertia switch is needed for all of the actuator assemblies in this embodiment.

In yet another alternate embodiment, On/Off Switch 400 is replaced with a rheostat that is actuated by the vehicle's operator in order to turn on the actuator assembly that pulses the manual brake linkage to reduce or eliminate tire skids. The rheostat enables the operator to vary the voltage, which in turn varies the frequency of the pulses from the actuator assembly. The rheostat also activates and disengages the lock and release assembly. In the present embodiment, a rheostat is need for each actuator assembly.

Referring to FIG. 4B, rheostat 407 is used in the present embodiment in combination with a switch 404. In order to function properly with rheostat 407, switch 404 is preferably a force switch, a pressure switch, or an inertia switch. The vehicle's operator manually controls the speed of the actuator assembly that varies the frequency of the pulses to the brake linkage using rheostat 407. Rheostat 407 is used after switch 404 automatically turns on the actuator assembly. In the present embodiment, a rheostat is needed for each actuator assembly.

In the present embodiment, the electronic controller uses On/Off switch 400 actuated by the vehicle's operator or automatic switch 404 to turn on actuator assembly 302 that pulses the manual brake linkage to reduce or eliminate tire skids. Once actuator assembly is turned on, rheostat 407 may be actuated by the operator to control the pulsing of actuator assembly 302. Switch 400 or 404 also turns on lock and release assembly 301 to connect actuator assembly 301 to the brake linkage. A typical application for an electronic controlled antiskid system in accordance with the present embodiment is in a bicycle.

Alternate embodiments of the present invention may incorporate an electronic controller that increases its functionality by incorporating a wheel speed sensor and a tone ring for each wheel that is coupled to a computing device such as, but not limited to, a smart phone by a wire or wireless connection. The tone ring and brake disc can be integrated into one assembly by making a gear shape on the inside or outside diameter of the brake disc. The wheel speed sensor and tone ring are preferably mounted outside the axle rather than inside the axle. The computing device may also comprise a GPS capability like those found on smart phones. With the use of application software, the computing device may interpret the wheel speed and compare it to the GPS ground speed calculated by the computing device. The electronic controller includes brake release switches for each wheel that enable the operator to manually turn the gearmotors in the actuator assemblies on or off to pulse the brake linkages or to stop the pulsing. Earphones located on the operator's left and right ears are connected to the computing device by wire or wireless connection. When the computing device determines that a wheel is skidding or about to skid, the computing device sends a tone to the left or right ear corresponding to the brake release switch that needs to be turned on to pulse the appropriate brake. The tone continues until the skidding stops to alert the operator to turn off the pulsing. In alternate embodiments a visual signal may be sent to the operator to warn the operator of wheel skidding, for example, without limitation, a flashing light on a control panel. In the present embodiment, the electronic controller can be powered by the vehicle's electrical system or by a portable battery. In some embodiments rheostats can be used instead of On/Off switches to vary the frequency of the pulses to the brake linkage.

The embodiments described in the foregoing are directed to relatively basic implementations of an electronically controlled antiskid system for manual hydraulic and mechanical brake systems. However, the embodiments illustrated by way of example in FIGS. 3A, 3B and 3C may also be implemented as a more advanced system by incorporating an electronic controller with advanced functions.

Figure 5:
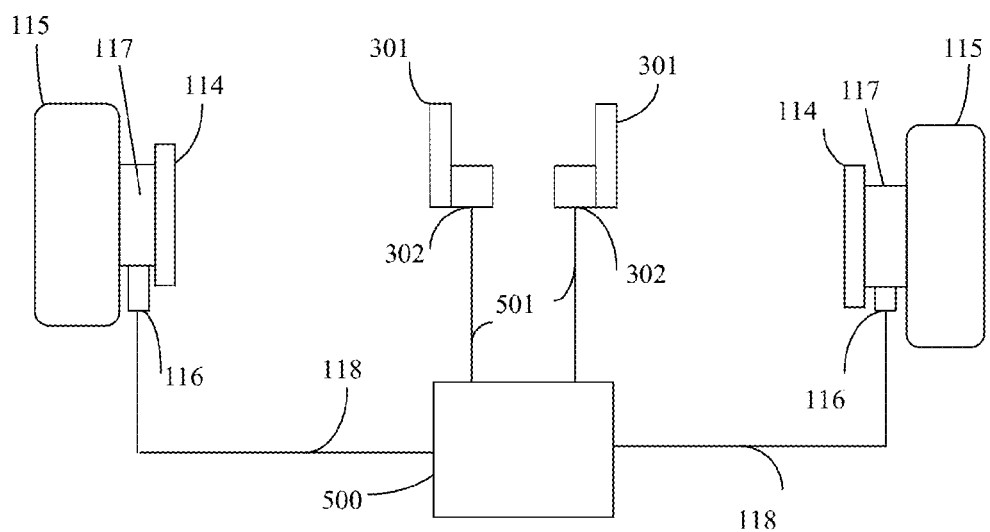
FIG. 5 is a schematic diagram of an exemplary electronic controller in an electronically controlled antiskid system installed on two wheels of a vehicle, in accordance with an embodiment of the present invention.

FIG. 5 is a schematic diagram of an exemplary electronic controller 500 in an electronically controlled antiskid system installed on two wheels 115 of a vehicle, in accordance with an embodiment of the present invention. In the present embodiment, the system comprises an actuator assembly 302 to set and hold a position of the brake linkage. This enables advanced electronic controller 500 to modulate the force from the brake pads on brake discs/drums 114. Modulating the force from the brake pads is more effective at preventing tire skids than pulsing the brake pads, which is done in the foregoing embodiments.

In the present embodiment, a switch is not required to actuate the antiskid system. Instead, advanced electronic controller 500 monitors the speed of wheels 115 as detected by wheel speed sensors 116 to determine if one wheel is rotating at a slower speed than the other wheel. Advanced electronic controller has electronic circuitry that can provide the electrical power for wheel speed sensors 116 and receive the wheel speed data for each wheel 115 through electric cables 118. In alternate embodiments the advanced electronic controller may be connected to the wheel speed sensors through a wireless connection. In the present embodiment, a tone ring 117 turns with wheel 115 and creates a magnetic field disruption that can be detected by wheel speed sensors 116 to enable wheel speed sensor 116 to determine the wheel speed. In alternate embodiments, the tone ring and the brake disc/drum can be integrated into one assembly by making a gear shape on the inside or outside diameter of the brake disc/drum. In the present embodiment, wheel speed sensor 116 and tone ring 117 are mounted outside the axle. Based on the difference in wheels speeds and the rate of change of the wheel speeds, advanced electronic controller 500 determines if a skid event is occurring or about to occur. Advanced electronic controller 500 also may use an optional Global Positioning Signal (GPS) to calculate the vehicle's ground or reference speed. This feature enhances the ability of advanced electronic controller 500 to detect and control skidding events.

When advanced electronic controller 500 detects a skidding event, it automatically commands a lock and release assembly 301 to connect actuator assembly 302 to the brake linkage system. Advanced electronic controller 500 then commands actuator assembly 302 to move the brake linkage a specific distance. When the brake linkage is moved, the force on the brake pads is reduced. No matter how hard the vehicle's operator pushes or pulls on the brake lever, it cannot be converted into a force on the brake pads because the brake linkage is generally prevented from moving. Once the skid is prevented, reduced or eliminated, advanced electronic controller 500 de-energizes lock and release assembly 301, which disconnects actuator assembly 302 from the brake linkage system, and actuator assembly 302 is commanded by advanced electronic controller 500 to return to its home position. With the antiskid system in its standby mode, the manual hydraulic or mechanical brake system remains fully functional until a new skid event is detected and the antiskid process is repeated again. The antiskid system remains in standby mode as long as the antiskid function is not needed or if there is a loss of electrical power. In an alternate embodiment, an advanced electronic controller may be used to pulse the actuator assembly rather than modulating the force on the brake pads.

An advantage of the advanced form of electronic controller 500 for an antiskid system for manual brakes is that electronic controller 500 can be adapted from the electronic controllers for antiskid systems for powered brakes. This includes both analog and digital controller designs that are available today. In addition, antiskid software algorithms for powered brake systems can also be adapted to be used with electronic controller 500. Adapting current antiskid electronics and software for electronic controller 500 makes it attractive to perspective manufacturers in the antiskid business as it will reduce both the development time and cost if they are licensed to produce an antiskid system according to the present embodiment. Advanced electronic controller 500 also has the computing power to capture and annunciate faults with the antiskid system. Advanced electronic controller 500 also provides an interface connection with the antiskid control panel located at the operator's station. Advanced electronic controller 500 may be powered by the vehicle's electrical system or by a portable battery.

In the present embodiment, actuator assembly 302 moves the brake linkage to reduce the force that is being applied to the brake pads and thus reduce or eliminate the tire skid. Actuator assembly 302 must have enough power to overcome the input force being applied by the operator's hand or foot. As shown by way of example in FIGS. 3A, 3B and 3C, actuator assembly 302 can be located in several locations throughout the hydraulic or mechanical brake linkage system. The power needed to overcome the mechanical leverage depends on where actuator assembly 302 is located in the brake linkage system. Actuator assembly 302 only needs to move the brake pad a small distance to reduce the force on brake disc/drum 114. For example, without limitation, testing has shown that when actuator assembly 302 is connected to the input shaft of the master cylinder, the input shaft must only move 0.07 inches to reduce the pressure from 400 PSI to 50 PSI.

Electricity is the primary source of power for actuator assembly 302. Power may be provided from the vehicle's electrical system, the vehicle's battery, or a portable battery through advanced electronic controller 500. Advanced electronic controller 500 is connected to lock and release assembly 301 and actuator assembly 302 through an electric cable 501. Vehicles with manual brake systems that have an electrical system usually have a Direct Current (DC) system. Consequently, actuator assembly 302 typically uses DC electricity. However, Alternating Current (AC) electricity can also be used with actuator assembly 302 by converting the vehicle's DC electrical power to AC electrical power for the antiskid system. Actuator assembly 302 is typically driven by an electric motor; however, a hydraulic or pneumatic motor can also drive actuator assembly 302. When a hydraulic or pneumatic motor is used, an electric motor drives a hydraulic or pneumatic pump that in turn drives the hydraulic or pneumatic motor that drives actuator assembly 302. Power can also be provided from an accumulator or tank that contains compressed gas that can drive a hydraulic or pneumatic motor. The accumulator can directly power a hydraulic or pneumatic cylinder. The motors that drive actuator assembly 302 in most implementations use a gearbox to reduce the speed and increase the torque of the output shaft of the motor. The gearbox can be integral with the motor or can be independent from the motor. The function of actuator assembly 302 is to move the brake linkage a small distance to reduce the force on the brake pad. Therefore, the electric, hydraulic or pneumatic motors, with and without gearboxes, in some cases must convert their rotary output motion into a linear motion.

Figure 6:
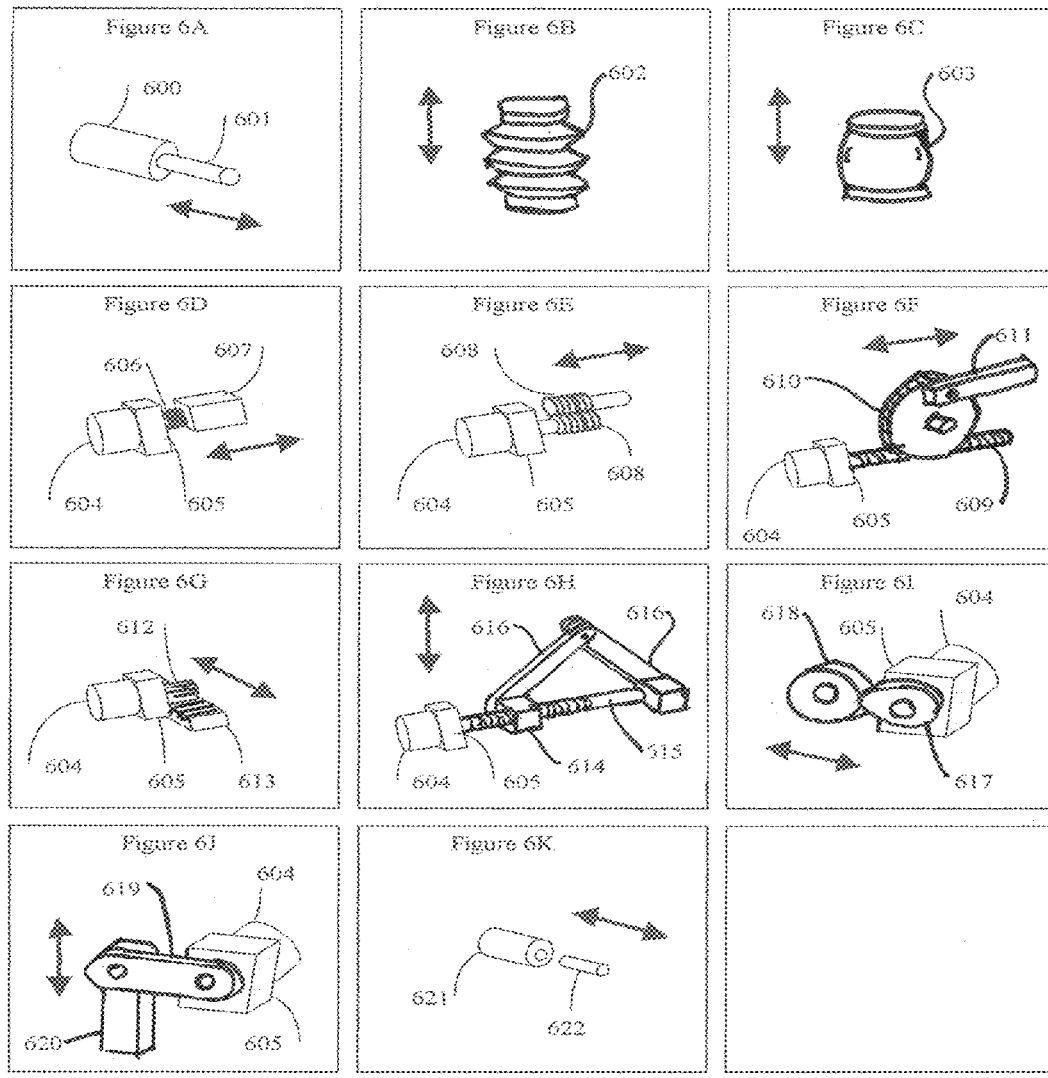
FIGS. 6A through 6K illustrate eleven different exemplary methods to drive an actuator assembly, in accordance with embodiments of the present invention.

FIGS. 6A through 6K illustrate eleven different exemplary methods to drive an actuator assembly, in accordance with embodiments of the present invention. FIG. 6A shows a piston. FIG. 6B shows a bellows actuator 602. FIG. 6C shows an inflatable accumulator 603. FIG. 6D shows a motor 604 with a screw 606. FIG. 6E shows motor 604 with helical gears 608. FIG. 6F shows motor 604 with a worm gear 609. FIG. 6G shows motor 604 with a gear 612 and a gear rack 613. FIG. 6H shows motor 604 with scissor arms 616. FIG. 6I shows motor 604 with a cam 617. FIG. 6J shows motor 604 with a lever arm 619. FIG. 6K shows an electric solenoid 621. Any of these methods can be used with an electronically controlled antiskid brake system for manual brakes to drive the actuator assembly.

FIGS. 6A through 6C show three methods for converting hydraulic or pneumatic power into a linear motion. Referring to FIG. 6A, a cylinder 600 comprises a piston inside to drive an output shaft 601 in a linear motion. Referring to FIG. 6B, bellows actuator 602 expands or contracts with the hydraulic or pneumatic power exerted onto it to convert this power into a linear motion. Referring to FIG. 6C, inflatable accumulator 603 converts hydraulic or pneumatic power into a linear motion in the same manner as bellows actuator 602.

FIGS. 6D through 6J use motor 604 to drive the actuator assembly. Motor 604 can be electric, hydraulic or pneumatically powered. Motor 604 uses a gearbox 605 to reduce the speed of the output shaft and increase the torque; however, all of these methods may be implemented without a gearbox. Motor 604 turns continuously and has the ability to reverse its rotation. Motor 604 and gearbox 605 convert the rotary motion of the output shaft of motor 604 into a linear motion to move the brake linkage. Referring to FIG. 6D, a nut 607 moves along screw 606 to convert the rotary motion of screw 606 into linear motion. Referring to FIG. 6E, two helical gears 608 interconnect so that the rotation of one helical gear 608 translates into the linear motion of the other helical gear 608. Referring to FIG. 6F, worm gear 609 interconnects with a worm wheel 610 to drive a connecting rod 611 in a linear motion. Referring to FIG. 6G, gear 612 and gear rack 613 interconnect so that the rotation of gear 612 moves gear rack 613 in a linear motion. Referring to FIG. 6H, scissor arms 616 are connected to motor 604 with a screw 615 and a nut 614. As screw 615 rotates, nut 614 moves along screw 615 and scissor arms 616 move up and down. Referring to FIG. 6I, cam 617 rotates, moving a cam follower 618 in a linear motion. Referring to FIG. 6J, lever arm 619 drives a connecting rod 620 in a linear motion.

Referring to FIG. 6K, electric solenoid 621 pulls or pushes an armature 622 with a magnetic field. Armature 622 moves the brake linkage.

Those skilled in the art, in light of the present teachings, will readily recognize that a multiplicity of other suitable means may be used to drive the actuator assembly in alternate embodiments. For example, without limitation, an electric servomotor may be used to drive the actuator assembly. The servomotor utilizes an electric motor coupled to a gearbox that has an electronic sensor that monitors the rotation and position of the output shaft of the gearbox. With the use of an electronic servo controller, the output shaft of the servomotor can be commanded to rotate a specific distance and hold that position.

In other non-limiting examples, the actuator assembly may utilize the independent elements described above and couple them together in various configurations. These elements can include, without limitation, combinations of electric motors, hydraulic or pneumatic pumps and motors, many different devices to convert rotary to linear motion, solenoids, hydraulic or pneumatic actuators and servomotors. These elements may also be integrated into sub-assemblies or complete assemblies to form the actuator assembly.

At least some preferred embodiments of the present invention may utilize one of two types of actuator assemblies. For example, without limitation, in a basic implementation, the actuator assembly 302 pulses the brakes by moving the brake linkage back and forth a short distance at a rate of several times a second. The linear actuators described above by way of example with respect to FIGS. 6D through 6H can pulse the brake linkages by reversing motor 604 several times a second. If a hydraulic or pneumatic cylinder is used to pulse the brake linkage as shown by way of example in FIGS. 6A through 6C, a control valve is needed to change the linear direction of cylinder 600. When a cam is used to convert the rotary motion of the output shaft of motor 304 into a linear motion as shown by way of example in FIG. 6I, motor 304 does not need to be reversed to pulse the brake linkage. Electric solenoid 621 can be used to pulse the brake linkage by turning solenoid 621 on and off. In more advanced implementations, the actuator assembly utilizes a servomotor that the electronic controller can command to move the brake linkage a specific distance and hold a position. When the brake system linkage is moved, the force on the brake pads is reduced. No matter how hard the vehicle's operator pushes or pulls on the brake lever, the force cannot be converted into a force on the brake pads because the brake system linkage is generally prevented from moving.

In at least some preferred embodiments the lock and release assembly connects the actuator assembly to the brake linkage. This connection is made when the antiskid function is needed to reduce the force on the brake pads to reduce or eliminate tire skids. The lock and release assembly must have enough power to connect it to the brake linkage and support the force applied by the actuator assembly. As shown by way of example in FIGS. 3A, 3B and 3C, the lock and release assembly can be located in several locations throughout the hydraulic or mechanical brake linkage. The power required to overcome the mechanical leverage depends on where the lock and release assembly is located in the brake linkage. Testing has shown that when the actuator assembly is connected to the input shaft of the master cylinder, the lock and release assembly must support a maximum force of approximately 225 pounds, which equates to 600 PSI. When the antiskid function is no longer needed, the lock and release assembly disconnects the actuator assembly from the brake linkage. This enables the normal manual brake operation to resume. On some vehicles, the release function must occur even when there is a power failure. In these cases a spring release is used that operates under the maximum load conditions. This is referred to as a fail-safe mode.

Figure 7:
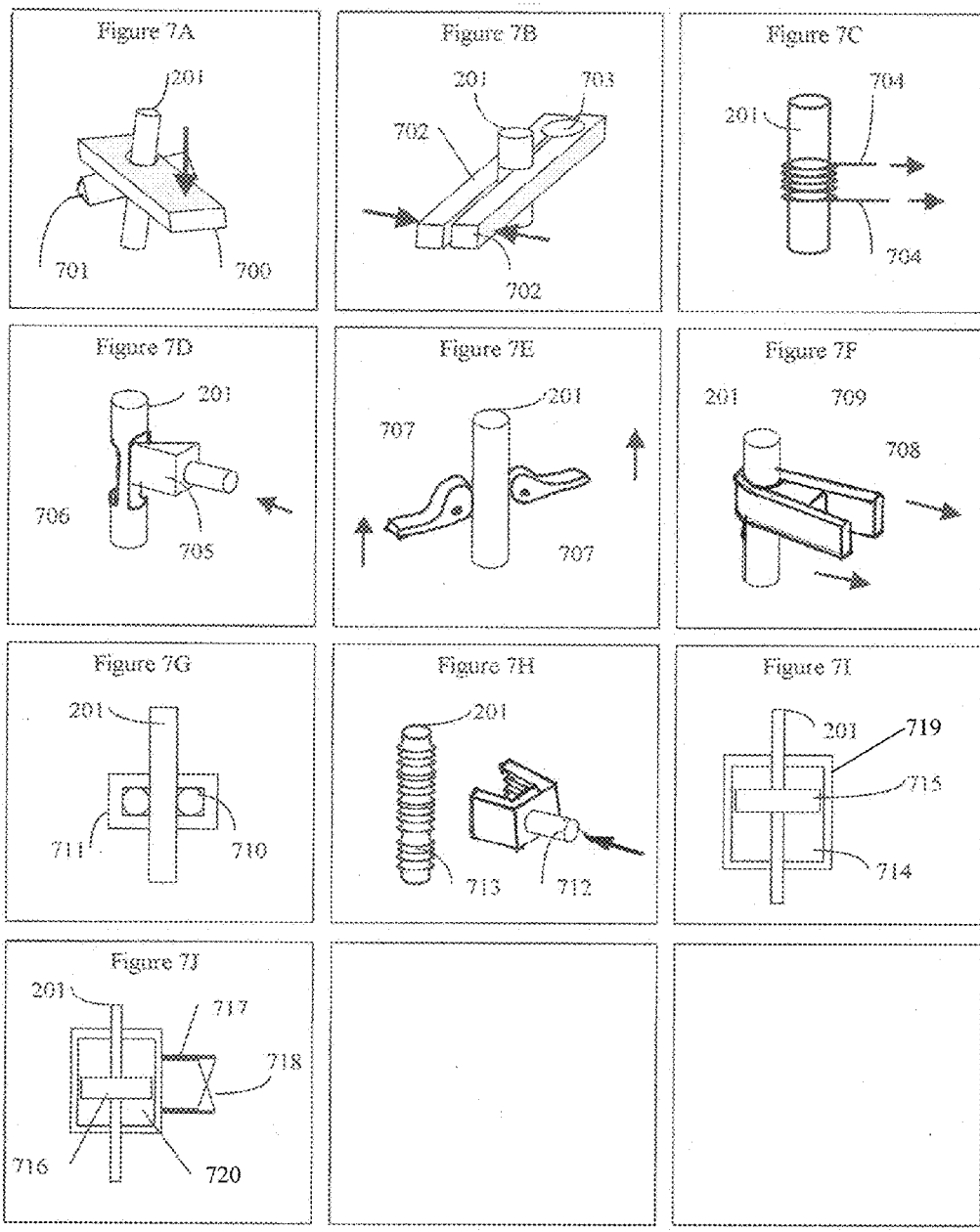
FIGS. 7A through 7J illustrate ten different exemplary methods of connecting a lock and release assembly to a brake linkage shaft, in accordance with embodiments of the present invention.

FIGS. 7A through 7J illustrate ten different exemplary methods of connecting a lock and release assembly to a brake linkage shaft 201, in accordance with embodiments of the present invention. FIG. 7A shows a locking tab method. FIG. 7B shows a locking clamp method. FIG. 7C shows a wire lock method. FIG. 7D shows a tapered wedge method. FIG. 7E shows a dual cam lock method. FIG. 7F shows a strap clamp method. FIG. 7G shows a locking collar method. FIG. 7H shows an external fork method. FIG. 7I shows an iron particle method, and FIG. 7J shows a hydraulic piston method. Referring to FIG. 7A, a hole in a locking tab 700 connects locking tab 700 to brake linkage shaft 201 when one end of locking tab 700 is moved in a parallel direction to brake linkage shaft 201. The diameter of the hole is slightly larger than brake linkage shaft 201. The thickness of locking tab 700 is preferably sized to create enough locking force while providing enough material not to deform under load. A pivot edge 701 partially establishes the force that is required to release locking tab 700. Varying the distance from brake linkage shaft 201 to pivot edge 701 changes the force required to release locking tab 700.

Referring to FIG. 7B, two jaws made of metal or other high strength material connect to brake linkage shaft 201 when the jaws are moved towards each other to create a locking clamp 702. A pivot point 703 located close to brake linkage shaft 201 creates additional leverage when the other end of the jaws of locking clamp 702 are brought together.

Referring to FIG. 7C, a wire lock 704 is created by wrapping a coil of wire around brake linkage shaft 201 and pulling tightly on both ends of the wire. Referring to FIG. 7D, a tapered wedge 705 is inserted into a tapered groove 706 to make a firm connection with brake linkage shaft 201. Referring to FIG. 7E, a dual cam lock 707 firmly connects to brake linkage shaft 201 when the cams are rotated. Referring to FIG. 7F, the ends of a strap 708 are pulled tight in relation to a support collar 709 to connect to brake linkage shaft 201. Referring to FIG. 7G, a locking collar 711 is connected to brake linkage shaft 201 by inflating a ring 710 with air or fluid.

Referring to FIG. 7H, a tapered fork 712 is placed over the outside diameter of brake linkage shaft 201. The outside diameter of brake linkage shaft 210 and the inside surface of tapered fork 712 may have matching grooves 713 to increase the integrity of the connection.

Referring to FIG. 7I, brake linkage shaft 201 comprises a piston 715 attached to brake linkage shaft 201 inside a cylinder 719. Also inside cylinder 719 are iron particles 714 that become rigid when electrified. When iron particles 714 are electrified, cylinder 719 locks to piston 715 and brake linkage shaft 201.

Referring to FIG. 7J, a hydraulic piston 716 connects to brake linkage shaft 201. This is done by preventing hydraulic fluid 720 from flowing freely in interconnected pipes 717 when a valve 718 is closed. Piston 716 connected to brake linkage shaft 201 is unable to move when fluid 720 is locked in place.

Those skilled in the art, in light of the present teachings, will readily recognize that a multiplicity of different suitable means may be used to connect the lock and release assembly the brake linkage, which enables the actuator assembly to move the brake linkage and reduce the force on the brake pads.

The lock and release assembly in at least some preferred embodiments requires an actuator to connect and disconnect it from the brake linkage. Electricity is the primary source of power for the lock and release assembly. Power may be provided from the vehicle's electrical system, the vehicle's battery, or a portable battery. Vehicles with manual brake systems that have an electrical system typically have a Direct Current (DC) system. Therefore, the lock and release assembly normally uses DC electricity. However, alternating current (AC) electricity can also be utilized to power the lock and release assembly. The lock and release assembly can be driven by an electric motor. A hydraulic or pneumatic motor can also drive the lock and release assembly. When a hydraulic or pneumatic motor is used, an electric motor drives a hydraulic or pneumatic pump that in turn drives the hydraulic or pneumatic motor that drives the lock and release assembly. Power can also be provided from an accumulator or tank that contains compressed gas that can drive a hydraulic or pneumatic motor. The accumulator can also directly power a hydraulic or pneumatic cylinder to operate the lock and release assembly.

When motors are used to drive the lock and release assembly, the motors in most cases use a gearbox to reduce the speed and increase the torque of the output shaft of the motor. The gearbox can be integral with the motor or it can be independent from the motor. The lock and release assembly may use an electric, hydraulic or pneumatic motor, with or without a gearbox, and in some cases the rotary output motion of the motor must be converted into a linear motion. FIGS. 6D through 6J illustrate seven exemplary methods for converting the rotary motion of the output shaft of a motor or gearbox to a linear motion. Any of these methods or other methods may be used with the lock and release assembly to convert the rotary motion of a motor or gearbox to a linear motion to move the brake linkage. For example, without limitation, when a hydraulic or pneumatic source of power is available, a hydraulic or pneumatic cylinder can be used to operate the lock and release assembly. These cylinders can utilize a piston, bellows or inflatable bag to convert the hydraulic or pneumatic energy into a linear motion, as shown by way of example in FIGS. 6A through 6C. An electric solenoid can also be used to operate the lock and release assembly by applying electrical power to a coil, which moves an armature with its magnetic field to move the lock and release assembly, as illustrated by way of example in FIG. 6K. The lock and release assembly can utilize the independent elements described above and couple them together in various different combinations. These elements may include, without limitation, combinations of electric motors, hydraulic or pneumatic pumps and motors, many different devices to convert rotary to linear motion, solenoids, hydraulic or pneumatic actuators and servomotors. These elements can also be integrated into sub-assemblies or complete assemblies to form the lock and release assembly.

As described in foregoing, there are many methods for incorporating the lock and release assembly and the actuator assembly for an electronically controlled antiskid system for vehicles with manual brakes in accordance with at least some preferred embodiments of the present invention. The following description outlines a preferred method of incorporating the lock and release assembly and the actuator assembly in a manual hydraulic brake system. On manual hydraulic brake systems, the master cylinder, the lock and release assembly and the actuator assembly can be combined into an integrated package that is referred to herein as an electric master cylinder (EMC). The master cylinder in the integrated package maintains the same geometry and retains the same functions as the manual master cylinder that has been certified for the vehicle. This enables the original manual brake system to remain certified and fully functional when the electronic controlled antiskid system is not operating.

Figure 8:
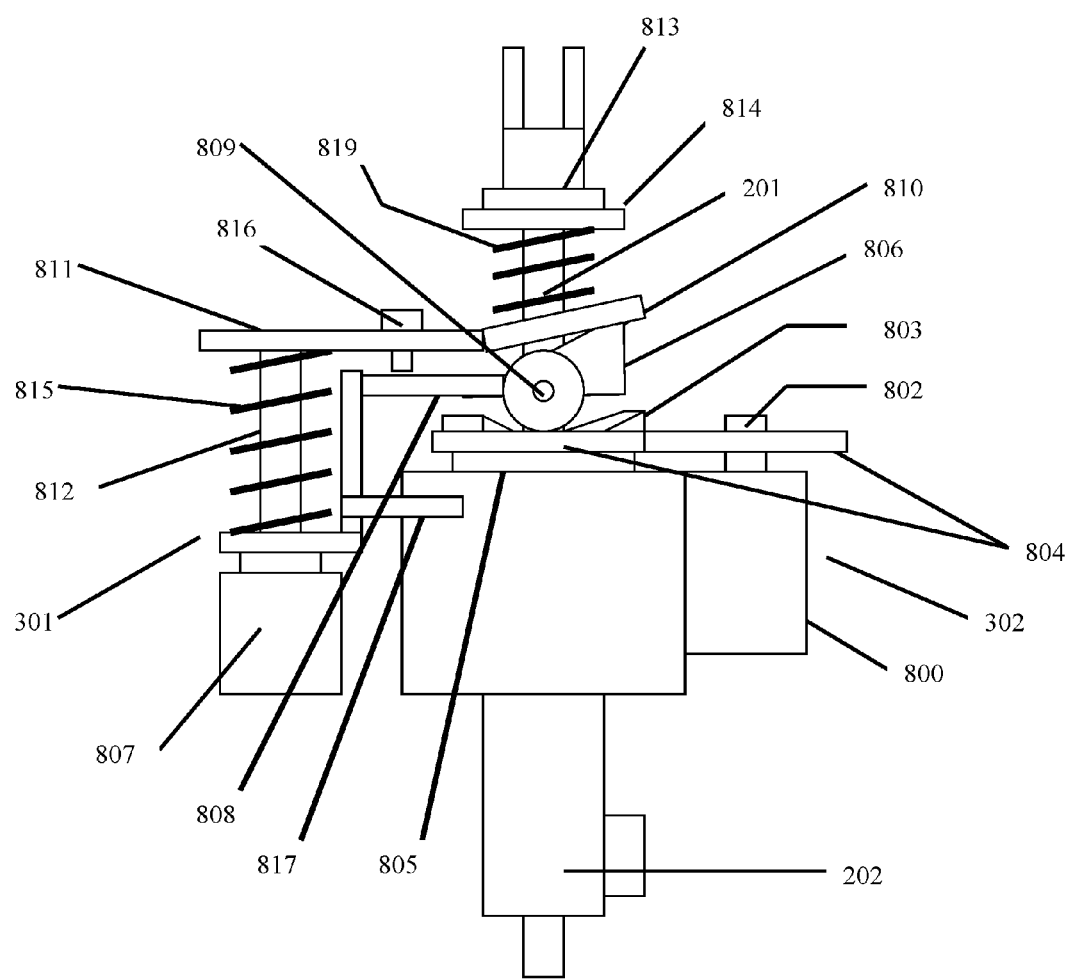
FIG. 8 is a side view of an exemplary electric master cylinder (EMC) with an integrated actuator assembly, in accordance with an embodiment of the present invention.

FIG. 8 is a side view of an exemplary electric master cylinder (EMC) with an integrated actuator assembly 302, in accordance with an embodiment of the present invention. In the present embodiment, the EMC comprises a motor 800 to control the movements of an input shaft 201. Motor 800 in the EMC may be one of two different types of electrical motors. The first type is a servomotor that supports an advanced implementation because the servomotor can rotate an output shaft 802 to a specific position as directed by an electronic controller. This controls the distance that input shaft 201 moves, giving the system the ability to modulate the hydraulic brake pressure. This pressure modulation feature increases the efficiency of the antiskid system.

The second type of motor that can be used on the EMC is a gearmotor. When energized, the gearmotor rotates continuously. This in turn rotates a cam 803 continuously raising and lowering input shaft 201 a set distance. The gearmotor "pulses" the brakes to reduce tire skidding. Because the hydraulic brake pressure cannot be modulated, the gearmotor configuration is a less efficient antiskid system compared to the servomotor configuration. A position switch is required to stop the gearmotor when the cam is in its lowest position.

In the present embodiment, electric motor 800 is attached to a master cylinder 202. Attached to output shaft 802 of motor 800 is a drive train 804. Drive train 804 couples output shaft 802 of motor 800 to cam 803. Several different types of drive trains can be used such as, but not limited to, gears (as shown), sprockets and chain, belts and pulleys, etc. Any of these drive trains may be used with either a servomotor or a gearmotor. In addition, the servomotor can use a push/pull rod to connect output shaft 802 to cam 803 because the output shaft of a servomotor only rotates approximately 90 degrees.

One end of drive train 804 is centrally located about output shaft 802 of motor 800 and the other end is centrally located about input shaft 201 of master cylinder 202. Mounted under cam 803 is a thrust bearing 805. Thrust bearing 805 reduces the friction and torque in drive train 804 from the force applied to input shaft 201 from a brake lever by an operator's hand or foot. Attached to drive train 804 and located at input shaft 201 is cam 803. Cam 803 uses ramps to raise and lower cam followers 806 when drive train 804 is rotated by motor 800. Cam 803 has one ramp for each cam follower 806. The slope of the ramps determines the rate and amount of modulation or pulsing on the brake system's hydraulic pressure. In the present embodiment, actuator assembly 302 comprises motor 800, output shaft 802, cam 803, drive train 804, and thrust bearing 805, and these items can be located radially in any position about input shaft 201 to create a compact design to facilitate the retrofit replacement of the manual master cylinder 202 with the integrated EMC in the vehicle.

In the present embodiment, a lock and release assembly 301 is also integrated into the EMC. Lock and release assembly 301 comprises cam followers 806 an electric lock solenoid 807, a mounting block 808, axles 809, a pivot edge 810, a lock tab 811, a lock solenoid armature 812, a nut 813, a washer 814 a release spring 815, a fastener 816, and anti-rotation ears 817. Lock and release assembly 301 can be located radially in any position about input shaft 201 to create a compact design to facilitate the retrofit replacement of the manual master cylinder 202 with the EMC. Lock and release assembly 301 connects actuator assembly 302 to input shaft 201 when there is a skidding situation. Electric lock solenoid 807 is energized by the electronic controller when lock and release assembly 301 needs to connect to input shaft 201 when the brake pressure must be lowered to generally prevent, reduce or eliminate a tire skid. The electrically actuated lock solenoid 807 is used in the present embodiment so that, if there is a loss of electrical power, the antiskid system automatically disconnects from input shaft 201 and the manual brake system remains fully operational. However, in alternate embodiments the lock and release assembly may use other connection means such as, but not limited to, those shown by way of example in FIGS. 6A through 6J. In the present embodiment, lock and release assembly 301 is integrated with manual master cylinder 202 and is centrally located about input shaft 201 of master cylinder 202. Lock and release assembly 301 comprises at least two cam followers 806 equally spaced around input shaft 201. Multiple cam followers 806 are needed to generally prevent side loading of input shaft 201 when cam 803 is rotated and input shaft 201 is raised and lowered. Cam followers 806 ride on the ramps of cam 803. When cam 803 is rotated by motor drive assembly 804, cam followers 806 are raised and lowered by rolling up and down the ramps of cam 803.

A mounting block 808 is required to secure cam followers 806 and lock solenoid 807 together as a single unit. Mounting block 808 has a vertical hole through it that centrally locates it about input shaft 201. Rocking of mounting block 808 about input shaft 201 is preferably minimized by having a close tolerance hole for input shaft 201 with a sufficient length to diameter ratio. Protruding from mounting block 808 are axles 809, which are used to attach cam followers 806 to mounting block 808. Mounting block 808 comprises pivot edge 810 located a short distance from input shaft 201. This distance partially determines the lock and release loads for lock tab 811. Also attached to mounting block 808 is lock solenoid 807. Lock tab 811 comprises a hole that centrally locates lock tab 811 about input shaft 201. The diameter and thickness of the hole are sized to create the necessary lock and release loads of lock tab 811. Lock tab 811 comprises a feature at one end to facilitate the attachment of lock solenoid armature 812. In the present embodiment, lock solenoid 807 is attached to mounting block 808 in such a way that lock solenoid 807 can be adjusted vertically to create the desired pull force with lock solenoid armature 812, which is attached to lock tab 811. When electrical power is applied to lock solenoid 807, a magnetic force is created that pulls lock solenoid armature 812 into lock solenoid 807. This pulls lock tab 811 towards lock solenoid 807, which secures lock tab 811 to input shaft 201.

A hold down spring 819 is centrally located about input shaft 201. Hold down spring 819 is retained on input shaft 201 with nut 813 and washer 814. Hold down spring 819 generally ensures that lock tab 811 remains seated against pivot edge 810 in both the locked and released modes of operation. Hold down spring 819 also generally ensures that lock and release assembly 301 returns to its lowest position when lock solenoid 807 is de-energized. Release spring 815 located between solenoid mounting block 808 and lock tab 811 generally ensures that lock tab 811 releases from input shaft 201 when lock solenoid 807 is de-energized. Release spring 815 is retained in the proper position by placing it over lock solenoid armature 812. Release spring 815 provides a fail-safe mode when used in conjunction with electric solenoid 807. The movement of lock tab 811 is restricted by fastener 816. Anti-rotation ears 817 are part of master cylinder 202 and generally prevent lock and release assembly 301 from rotating about input shaft 201 when the actuator assembly 302 is operating.

In some embodiments the hydraulic cylinder, shown by way of example in FIG. 3B, may use the same elements of the EMC to create an integrated package combining the hydraulic cylinder 304, the lock and release assembly 301 and the actuator assembly 302.

Testing of a prototype EMC has shown that 38 watts of electrical power is used to operate both lock and release assembly 301 and actuator assembly 302. This level of power consumption is achieved at a pressure of 600 PSI. Actuator assembly 302 and lock and release assembly 301 work against a force on input shaft 201 of 225 pounds to attain the 600 PSI of brake pressure. Testing of the prototype EMC has also revealed that hydraulic brake pressure may be modulated at a rate of 1000 PSI per second and the pressure may be set within 10 PSI using a servomotor. The total weight for lock and release assembly 301 and actuator assembly 302 in the present embodiment is less than one pound.

In at least some preferred embodiments, the function of a wheel speed sensor is to provide a signal to an electronic controller that can be used to determine the speed that the wheel is turning. There are two types of wheel speed sensors that can be used in an electronically controlled antiskid system for vehicles with manual brakes. The first type is a variable-reluctance sensor. The disadvantage of the variable-reluctance sensor is the decreasing signal strength as the wheel rotation slows. This means that the antiskid function cannot operate below a vehicle speed of approximately 10 miles per hour due to an insufficient signal from the wheel speed sensor. The second type of wheel speed sensor is an active or magneto-resistive sensor. This type of sensor cannot generate a signal on its own and needs input power from the electronic controller to operate. However, an advantage of the magneto-resistive type of wheel speed sensor is that it can operate down to zero wheel speed. This means the antiskid function can work down to zero vehicle speed making the antiskid function available during both high and low speeds.

Figure 9:
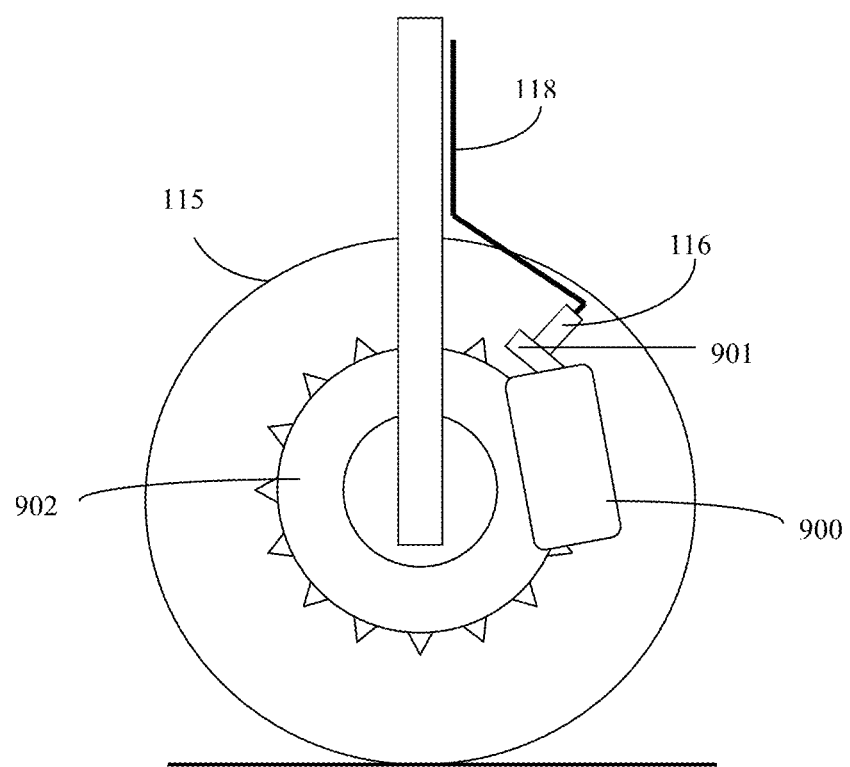
FIG. 9 is a side view of an exemplary wheel speed sensor attached to a brake caliper located on a main wheel, in accordance with an embodiment of the present invention.

FIG. 9 is a side view of an exemplary wheel speed sensor 116 attached to a brake caliper 900 located on a main wheel 115, in accordance with an embodiment of the present invention. In the present embodiment, wheel speed sensor 116 is connected to brake caliper 900 using a bracket 901. Bracket 901 can be an integral part of brake caliper 900 or it can be a separate item that is attached to brake caliper 900. An electrical cable 118 with suitable conductors and shielding transmits electrical power from an electronic controller to wheel speed sensor 116. The same electrical cable 118 transmits the wheel speed signal from sensor 116 to the electronic controller.

The variable-reluctance and magneto-resistive types of wheel speed sensors both require a gear-shaped tone ring to operate. When the tone ring rotates near a wheel speed sensor of either type, a magnetic field fluctuates around the sensor. The electronic controller interprets the voltage and frequency variation sent from sensor 116 and converts this information into a speed of rotation of wheel 115. In the present embodiment, the tone ring is incorporated into a brake disc 902 by cutting a gear shape into the outside circumference of brake disc 902. This enables brake disc 902 to perform the function of a tone ring. In alternate embodiments the gear shape may be cut into the inside diameter of the brake disc. In the present embodiment, wheel speed sensor 116, attached to brake caliper 900, and brake disc 902, which functions as a tone ring, are externally mounted to the axle of wheel 115.

An embodiment of the present invention relates to an antiskid system that modulates the brake linkage to generally prevent tire skidding. Some embodiments may be made to pulse the brake linkage without an electronic controller or wheel speed sensors. These embodiments may often be implemented on bicycles, electric bikes, electric and gas powered scooters, motorcycles, etc. These embodiments may also be used in general aviation aircraft. Bicycle, scooters and motorcycles typically utilize one of two types of brake systems; hydraulic brake systems or mechanical brake systems. FIG. 2A shows an exemplary hydraulically actuated brake system. FIG. 2B shows a mechanically actuated brake system that typically utilizes a pull cable. The embodiments described by way of example below may apply to one or both of these types of manual brake systems.

Referring to FIG. 3B, this embodiment comprises cylinder 304 that can be added to a manual hydraulic brake system to modulate the brake pressure. Cylinder 304 provides a mechanical linkage that can be connected to an actuator to raise, lower and hold a specific brake pressure. Today most high end mountain bikes have hydraulic disc brakes. In order to pulse the brake linkage in an embodiment of the present invention, an apparatus similar to cylinder 304 may be added to a hydraulic brake system. This apparatus provides a mechanical linkage that typically allows the brake pressure to be pulsed several times a second by an actuator.

Figure 10A:
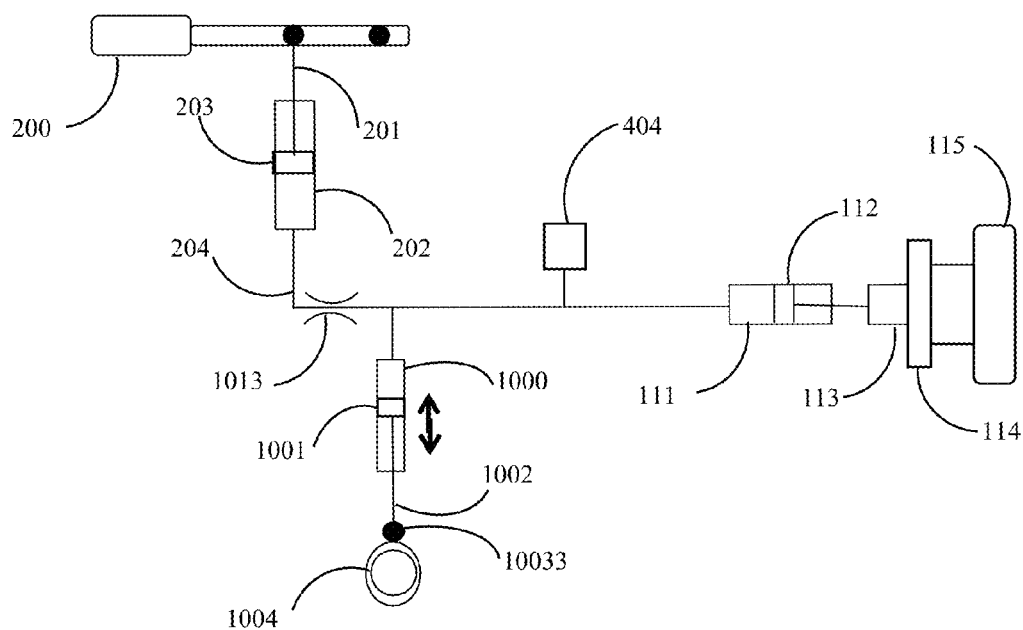
Figure 10C:
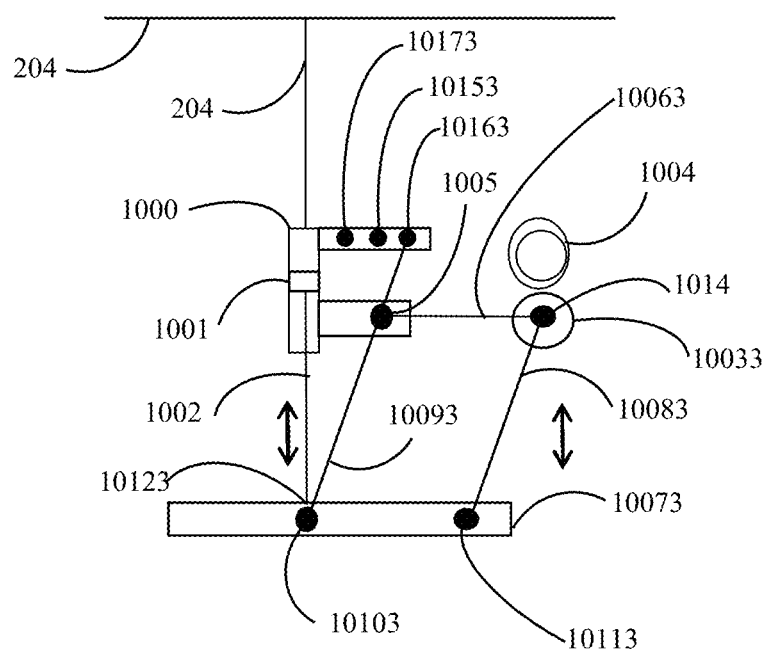

FIGS. 10A, 10B and 10C are schematic diagrams showing an exemplary manual hydraulic brake system, in accordance with an embodiment of the present invention. FIG. 10A is an overall view of the hydraulic system comprising a cylinder 1000 that is added to a hydraulic brake line 204 in order to pulse the brakes. FIG. 10B is a close-up view of one method for varying the distance that a piston 1001 may be moved. FIG. 10C is a close up view of how the range of motion of piston 1001 can be changed from full movement to zero movement. In the present embodiment, cylinder 1000 comprises piston 1001 that pulses the brakes when piston 1001 is moved back and forth. Unlike cylinder 304 shown by way of example in FIG. 3B, piston 1001 is moved in only one direction by an actuator. The hydraulic force from a brake lever 200 pushes a piston 1001 in the opposite direction. The one way actuator pulses the brakes while allowing the operator to modulate the brake pressure as needed with their hands or feet. The distance piston 1001 is moved and the frequency of movement generally remains constant and does not impact the operator's ability to apply light, medium or heavy brake pressure.

It is contemplated that many different types of actuators can be used to pulse the brakes. For example, without limitation, FIGS. 6A thru 6K show 11 exemplary types of actuators that can be used to pulse the brakes. Hydraulic, pneumatic or electrical power can be used to provide the energy for these actuators. Referring to FIG. 10A, a cam follower 1003 rides on a cam 1004 to create a back and forth pulsing motion. This is a cam actuation system similar to the system shown by way of example in FIG. 6I. Piston 1001 pushes on cam follower 1003 thru a linkage 1002. In some embodiments, piston 1001 and linkage 1002 may be combined into a single item. In other embodiments, cam follower 1003 may be eliminated so that linkage 1002 pushes directly on cam 1004.

In some embodiments, the vehicle's forward momentum may be used to power the actuator that pulses the brakes. This type of power source can be used on virtually any vehicle with manual brakes that are hydraulically actuated, cable actuated or actuated by a mechanical linkage. In some such embodiments, the actuator can be powered by the rotation of the vehicle's wheel rolling on the ground. In other embodiments for caliper brakes, the rim of the wheel may comprise high and low segments to enable the rim to be used as cam 1004 in the antiskid system. In other embodiments the disc brake rotor, e.g. 1201, may comprise high and low segments, e.g. 1205 and 1206, around the perimeter of the rotor to enable the rotor to be used as a cam in the antiskid system. Since the brake rotor 1201 is connected to the wheel 115, the brake rotor is always turning whenever the vehicle is moving. The use of the rotor 1201 as a cam enables the system to convert the vehicle's forward momentum into the energy needed to power the pulse actuator. A cam follower 1003 riding on the circumference of the rotor 1201 provides the back and forth motion needed to pulse the brakes. In some instances the cam follower may come into contact with the rotor 1201 at times in which the brakes are not being applied. This may cause noise and absorb some energy, and it is believed that cyclists are often sensitive to any loss of energy. Therefore, some embodiments may comprise a retracting feature that lifts the cam follower off the rotor 1201 when there is no braking to generally prevent no loss of energy. For example, without limitation, a simple spring, e.g. 1203, and mechanical stop, e.g. 1202, can be used as one method to incorporate this retract feature. Many different types of springs can be used such as a metal spring, an elastomeric spring or a gas spring. A magnet can be used to repel or attract cam follower 1004 to the retracted position. This includes both a permanent magnetic and an electromagnet. A counterbalance weight can be used to lift the cam follower off the rotor when there is no braking. An airfoil or wind deflector can use the aerodynamic force from the bike's forward speed to lift cam follower 1003 off the rotor when there is no braking. In some embodiments the rotor/cam 1201 powered by the vehicle's forward momentum may be used to tune the performance of the pulse system. The number of lobes, i.e. 1205 and 1206, on the rotor/cam 1201 can dictate the pulse frequency when combined with the tire diameter and vehicle speed. In addition, the height of the cam lobes dictates how far the brake linkage is moved. Dynamic testing revealed that there is an optimum pulse frequency and optimum linkage movement that provides maximum tire grip. The distance the linkage is moved varies with the type of brake system. Bicycles with mechanical cable disc brakes need to move the brake linkage a different distance than bicycles with hydraulic disc brakes to provide maximum performance. If the linkage is not moved enough, there is little increase in tire grip. If the linkage is moved too much, there is excessive pulsing of the brake lever with no additional improvement in tire grip. If a cam actuator is used, the height of the cam lobes determines how far the linkage is moved. Testing showed that moving the linkage the same distance on the same type of brake systems (cable or hydraulic) made by different brake manufacturers provided efficient antiskid performance. The optimum pulse frequency for bicycles remains constant for both mechanical and hydraulic bicycle brakes. If a cam type actuator powered by the bicycle's forward momentum is used, the number of cam lobes is determined by using the rider's average speed, the size of the bicycle's tire and power transmission ratio to determine the optimum pulse frequency. A rotor/cam for a hydraulic brake system with a 1:1 power transmission ratio will have 1, 2, or 3 lobes depending on the average speed of the rider and the diameter of the tire, Testing also revealed that cams with the high and low lobes the same size and equally spaced provided excellent performance. Tuning the pulse frequency and linkage movement enables efficient antiskid performance to be achieved with the pulse system. Dynamic testing showed an improvement in bicycle tire grip using the pulse antiskid system of up to 18% on dry asphalt, 25% on hard packed dirt and 28% on wet asphalt depending on the rider's weight.

Some embodiments may comprise a lockout feature that turns off the antiskid pulse system by generally preventing cam follower 1003 from contacting rotor/cam 1201 when the brakes are applied. By not allowing cam follower 1003 to contact rotor/cam 1201, the hydraulic brakes continue to operate normally with no pulsing. One non-limiting example of a lockout method is to use a screw or latch to generally prevent cam follower 1003 from contacting rotor/cam 1201 when the antiskid function is not desired. Another non-limiting example of a lockout method is to use a pin, e.g. 1202, into slot 1204 in linkage 1002 to generally prevent cam follower 1003 from movement and contacting rotor/cam 1201. In some embodiments the lockout feature may be connected to a mechanical or hydraulic linkage for remote operation by the vehicle's operator. Alternatively, a hydraulic, pneumatic or electric actuator can also be used to remotely move the lockout feature.

The pulse antiskid performance may be optimized by varying the distance that the brake linkage is moved. Referring to FIG. 10B, one method for varying the distance piston 1001 is moved is shown. In the present embodiment, a rocker arm 1007 is connected to cam follower 1003 by a linkage 1008. Linkage 1008 pivots at points 1014 and 1011. Cam follower 1003 is connected to cylinder 1000 by a linkage 1006. Linkage 1006 pivots at points 1005 and 1014. Rocker arm 1007 is also connected to cylinder 1000 by linkage 1009. Linkage 1009 pivots at points 1005 and 1010. Linkage 1009 is held in position by locking pin 1015. When cam 1004 rotates, cam follower 1003 moves linkage 1008, which in turn moves rocker arm 1007. Rocker arm 1007 pivots about a point 1010 pushing piston linkage 1002 and piston 1001. Piston linkage 1002 is not connected to rocker arm 1007. Hydraulic pressure in cylinder 1000 pushes piston 1001 and piston linkage 1002 against rocker arm 1007 at contact point 1012. When the distance between pivot points 1010 and 1011 is the same as the distance between pivot point 1010 and contact point 1012, piston 1001 moves the same distance as the lift distance on cam 1004.

Referring to FIG. 10C, the distance piston 1001 moves can be changed from full movement to zero movement. Linkages 1008 and 1009 form a parallelogram. When linkage arm 1009 is locked in a new position at locking point 1016, rocker arm 1007 is moved so that pivot point 1010 is in line with piston linkage 1002 contact point 1012, and no motion is transmitted to linkage 1002 or piston 1001. The amount of movement of piston 1001 can be changed over a range from full movement (100%) to no movement (0%) by moving linkage arm 1009 from locking points 1016 to 1017. When piston 1001 doesn't move (0%), there is no pulsing causing an antiskid lockout condition. Linkage arm 1009 can be positioned from full movement (100%) to no movement (0%) on the pulse antiskid unit using various different means such as, but not limited to, an adjustable latch, pin, screw or clamp. This allows the vehicle's operator to adjust the distance the brake linkage is moved to optimize the antiskid performance for the current riding conditions. In some embodiments the system may comprise a mechanical or hydraulic linkage on the rocker arm for remote operation by the vehicle's user. In other embodiments a hydraulic, pneumatic or electric actuator can also be used to remotely move the rocker arm.

Some embodiments may integrate the pulse actuator into the brake caliper. Referring to FIG. 10A, in these embodiments, a brake cylinder 111, a brake piston 112, a brake pad 113, cylinder 1000, piston 1001, linkage 1002, and cam follower 1003 are combined into a single package. This integration saves weight by eliminating the actuator mounting bracket, mounting fasteners and some hydraulic fittings. This integration also allows the brake component manufacturer to optimize the brake system elements for potential improvement in antiskid performance.

Other embodiments may be implemented as a standalone antiskid pulse system that may be added to bikes and other vehicles that already exist. For existing vehicles with manual hydraulic brakes, cylinder 1000, piston 1001, linkage 1002, and cam follower 1003 are combined into a package that can be attached to the vehicle. In some embodiments, some or all of the components mentioned, a mounting bracket and hydraulic fittings may be combined into an integrated package to facilitate retrofitting of the vehicle by attaching the system to the vehicle using the same bolt(s) that attach the brake caliper to the vehicle.

In some embodiments one or more pulse antiskid systems can be added to a vehicle with manual hydraulic brakes. Since the pulse antiskid systems work independently of each other, a vehicle may use one antiskid system on a single wheel or the vehicle may have a pulse antiskid system on every wheel. On some vehicles, such as, but not limited to, golf carts, all-terrain vehicles or riding lawnmowers, a single pulse antiskid system can be used to reduce skidding on multiple wheels that are actuated by a common brake line.

Referring to FIG. 10A, when the pulse antiskid system is combined with a manual hydraulic brake system, a brake lever 200 may move slightly back and forth when the brakes are being pulsed by the antiskid system. In the present embodiment, an orifice 1013 is placed in a brake line 204 upstream of cylinder 1000 to restrict the flow of the brake fluid and reduce the amount of movement of brake lever 200. Testing has shown that if orifice 1013 has a cross sectional area half the size of the fittings in brake line 204, the movement of brake lever 200 may be reduced by approximately 33% when the antiskid system pulses the brakes. Alternate embodiments may be implemented without an orifice in the brake line.

In some applications, general aviation aircraft may use the pulse antiskid system for manual hydraulic brakes. Referring to FIG. 10A in these embodiments, cam 1004 may be powered by an electric motor. The electric motor is energized by a pressure switch 404 when a pre-determined brake pressure is attained. The electric motor powering cam 1004 turns off when the pilot reduces the brake pressure to a pre-determined level that opens circuit in pressure switch 404.

Pulse antiskid systems according to some embodiments of the present invention may offer many benefits to a user. One benefit is that the rider of a bicycle may be able to go faster when riding downhill with a pulse antiskid system. The pulse antiskid system generally prevents tire skidding and the resulting fishtailing that leads to loss of momentum. The rider can typically take a faster line because the pulse antiskid system generally enables the tire to grip the trail or road more efficiently when braking. Another benefit of a pulse antiskid system on any type of bike, scooter or motorcycle is enhanced safety and stability. When a tire skids while the rider is turning, the tire loses its grip on the road or trail and the bike may fishtail. With the high center of gravity that is common of bikes, this fishtailing can lead to loss of control of the bike. Pulse antiskid systems can increase tire grip in a braking turn. Another benefit of the pulse antiskid system is that there is less trail erosion when braking. When a tire skids in dirt, it often digs a small rut in the trail and throws the displaced dirt to the side. The pulse antiskid system can reduce trail erosion when braking by generally preventing tire skidding. Yet another benefit of having a pulse antiskid system on a bike, scooter or motorcycle is increased tire life. A skidding tire removes the rubber on the tire faster than when the tire is not skidding. By skidding less, the tire last longer. Yet another benefit of the pulse antiskid system is that it is tunable to the bike, brake system and rider's skill level. By changing the cam, the frequency of pulsing and the distance the brake linkage is moved, the system can be optimized for maximum antiskid performance. Yet another benefit of the pulse antiskid system is that it works independently for each wheel. A pulse antiskid brake system can be attached to one or more wheels on vehicles and the performance of each pulse antiskid system is not impacted by the other pulse antiskid system(s).

Referring to FIG. 3C, a manual mechanical brake system that modulates the brake linkage to achieve the desired brake pad force to prevent or reduce skidding is shown by way of example. In this embodiment the modulation system uses an electronic controller, wheel speed sensor and an actuator that can set and hold the brake linkage in a specific position. According to the present embodiment, a pulse antiskid system for manual mechanical brakes may be simpler than the modulation antiskid system as the pulse antiskid system does not use wheel speed sensors and in many cases does not use an electronic controller.

Figure 11:
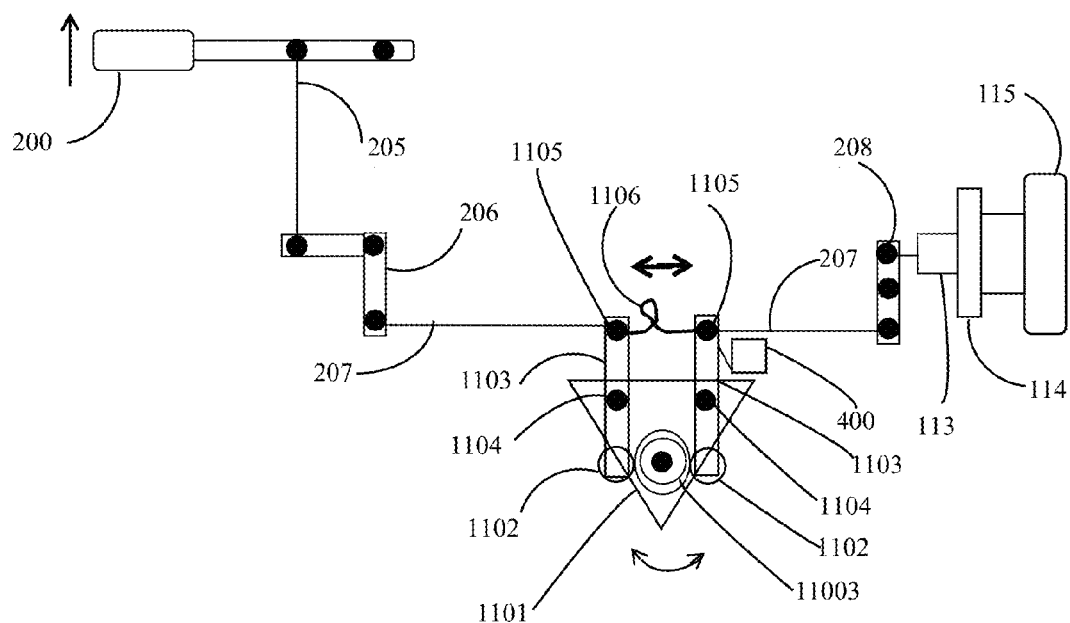
FIG. 11 is a schematic diagram illustrating an exemplary pulse antiskid system for mechanical brakes, in accordance with an embodiment of the present invention.

FIG. 11 is a schematic diagram illustrating an exemplary pulse antiskid system for mechanical brakes, in accordance with an embodiment of the present invention. In the present embodiment, the system comprises a cam 1100, a mounting base 1101, cam followers 1102, pivot arms 1103, pivot points 1104, attachment points 1105 and a brake cable loop 1106 that make up a mechanical linkage actuator assembly. Moving an actuator with the brake linkage typically allows the brake linkage to be pulsed a small amount while moving a larger distance to apply full braking. In the present embodiment, the actuator is able to move with a mechanical brake linkage 207. This generally enables the actuator to be ready to move a small distance to pulse brake linkage 207 no matter where linkage 207 is positioned. Cam followers 1102 are attached to pivot arms 1103. Pivot arms 1103 are mounted to base 1101 at pivot points 1104. Mounting base 1101 is free to rotate about cam 1100. This typically allows pivot arms 1103 to move freely with brake linkage 207 when a brake lever 200 is pulled. The free movement of pivot arms 1103 is independent of cam 1100, rotating or not. Brake linkage 207 is attached to pivot arms 1103 at attachment points 1105.

Many different types of actuators can be used to pulse the brakes. FIGS. 6A thru 6K show 11 different types of actuators that can be used to pulse the brakes. Moreover, various different energy sources may be used for these actuators; for example, without limitation, hydraulic, pneumatic or electrical power can be used to provide the energy for these actuators. Referring to FIG. 11, cam followers 1102 ride on cam 1100 to create a back and forth pulsing motion. This is similar to the actuation system shown by way of example in FIG. 6I. In another embodiment, the cam followers may be eliminated so that pivot arms 1103 directly contact cam 1100.

In the present embodiment, cam 1100 can be powered by hydraulic, pneumatic or electrical power. In some embodiments the cam may be powered by the vehicle's forward momentum. For example, without limitation, in one such implementation, two small sprockets and a timing belt may be used to transfer the power from the vehicle's rotating wheel to the cam. Some embodiments may use cam 1100 to tune the performance of the pulse system. The number of lobes on cam 1100 typically dictates the pulse frequency when combined with the tire diameter and vehicle speed. The height of the cam lobes dictates how far the brake linkage is moved. Referring to FIG. 11, cam 1100 comprises 2 opposed lobes. Other embodiments may be implemented with cams of various different shapes and sizes comprising one or more lobes. Pulsing the brake linkage has proven to provide effective antiskid protection for bicycles. The pulse frequency and distance the brake linkage is moved typically affect the performance of the antiskid protection. One may expect that correctly tuning the pulse frequency and linkage movement may result in efficient antiskid performance with the pulse system. Testing on bicycles has shown that pulsing the brake linkage several times a second provides good antiskid protection when coupled with moving the brake linkage an appropriate distance.

Some embodiments may comprise a lockout feature that turns off the antiskid pulse system. This may be accomplished by replacing a cam that has one or more lobes with a cam that has zero lift, or no lobes. When a zero lift cam is rotated, the cam does not move the cam followers or the pivot arms and there is no pulsing of the brake linkage. In some embodiments other lockout methods such as, but not limited to, screws, pins or latches to generally prevent the cam followers from contacting the cam when the antiskid function is not desired may be used. These lockout methods can be connected to a mechanical or hydraulic linkage for remote operation by the rider. In some embodiments, a hydraulic, pneumatic or electric actuator can also be used to remotely actuate the lockout feature.

In the present embodiment, the pivot arm pulsing unit generally enables the brakes to operate normally even when cam 1100 is not turning. This means the brakes typically continue to work even if the power source that rotates cam 1100 becomes inoperative. When an electric motor is used to power cam 1100, a switch 400 turns the motor on and off when the brakes are applied. Referring to FIG. 11, when brake lever 200 is pulled by the operator to apply the brakes, pivot arms 1103 are moved away from switch 400. This closes the circuit and turns on the motor. When the brakes are released by the operator, pivot arms 1103 move back and touch switch 400. This opens the circuit and turns off the electric motor. Some alternate embodiments may be implemented without an integrated switch or with a switch in a different location such as, but not limited to, near the brake lever.

Brake cable 207 is loosened or cut between attachment points 1105 to allow cable 207 to be pulsed back and forth. In the present embodiment, brake cable 207 comprises a small "S" or loop 1106. This small loop 1106 generally enables the flexible cable 207 to be pulsed without having to cut cable 207.

Some embodiments may be made as a standalone antiskid pulse system that may be added to bikes and other vehicles that already exist. For existing vehicles with manual mechanical brakes, cam 1100, mounting base 1101, cam followers 1102, pivot arms 1103, pivot points 1104, attachment points 1105 and loop 1106 may be combined in a package that may be attached to the vehicle. In some embodiments, some or all of the aforementioned components and a mounting bracket may be combined into an integrated package to facilitate retrofitting of the vehicle. Some of these embodiments may be attached to a bike using the bolt(s) that attach the brake caliper to the bike.

One or more pulse antiskid systems according to some embodiments of the present invention can be added to a vehicle with manual mechanical brakes. Since the pulse antiskid systems work independently, a vehicle may use a single antiskid on a single wheel or the vehicle may have a pulse antiskid system on multiple wheels. On some vehicles, such as, but not limited to, golf carts, a single pulse antiskid system can be used to reduce skidding on multiple wheels that are actuated by a common linkage.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of providing a pulsing antiskid braking system according to the present invention will be apparent to those skilled in the art. The invention has been described above by way of illustration, and the specific embodiments disclosed are not intended to limit the invention to the particular forms disclosed. For example, the particular implementation of the antiskid system may vary depending upon the particular type of vehicle on which it is to be used. The vehicles described in the foregoing were directed to two wheeled implementations; however, similar techniques are to provide antiskid systems for vehicles that have fewer or more wheels such as, but not limited to, unicycles, tricycles, three wheeled motorcycles, all-terrain vehicles (ATVs), etc. Non-two wheeled implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. An antilock brake system comprising:
    an actuator assembly for a hydraulic brake system of a vehicle, wherein said hydraulic brake system comprises a brake lever coupled to a master cylinder, a brake cylinder coupled to said master cylinder via a hydraulic line, a brake rotor coupled to a wheel of said vehicle, one or more brake calipers with brake pads coupled to said brake cylinder and positioned for contacting said brake rotor when said brake lever is activated, said actuator assembly comprising:
        a one-way cylinder with a piston, said one-way cylinder coupleable at a first end to said hydraulic line between said master cylinder and said brake cylinder;
        a cam comprising one or more high and low segments integrated onto the circumference of said brake rotor; and
        a cam follower coupled to said piston through a linkage at a second end of said one-way cylinder and positioned to ride on said circumference of said brake rotor, wherein activation of said brake lever causes said cam follower to ride on said circumference of said brake rotor resulting in a back and forth motion of said piston during rotation of said wheel thereby pulsing the brake calipers to prevent a skid.

2. The antilock brake system of claim 1, wherein said hydraulic brake system comprises a disk brake system.

3. The antilock brake system of claim 1, wherein said activation of the hydraulic brake system is by application of force to said brake lever.

4. The antilock brake system of claim 1, further comprising:
    an orifice placed in the hydraulic line anywhere between the master cylinder and the one-way cylinder to reduce feedback of the pulsing effect on the brake lever.

5. The antilock brake system of claim 4, further comprising:
    a lockout mechanism to turn on and off the actuator assembly.

6. The antilock brake system of claim 1, further comprising:
    a retract mechanism that lifts the cam follower off the cam when there is no braking.

7. An antilock brake system comprising:
    an actuator assembly for a hydraulic brake system, said actuator assembly comprising:
        a one-way cylinder with a piston, said one-way cylinder coupleable at a first end to a hydraulic line between a master cylinder and a brake cylinder;
        a connecting rod coupled to said piston through a second end of said one-way cylinder;
        a cam follower coupled to said connecting rod; and
        a brake rotor with its circumference configured with a series of alternating high and low segments, wherein said cam follower is positioned to ride on said circumference of said brake rotor, wherein rotation of said brake rotor about its axis causes said cam follower to drive said piston in a back and forth motion upon activation of the brake system thereby creating a pulsing effect on one or more brake calipers coupled to said brake system.

8. The antilock brake system of claim 7, wherein said hydraulic brake system comprises a disk brake system.

9. The antilock brake system of claim 8, wherein said alternating high and low segments on said brake rotor circumference acts like a cam.

10. The antilock brake system of claim 7, wherein said activation of the brake system is by application of force to a brake lever.

11. The antilock brake system of claim 10, further comprising:
    an orifice placed in the hydraulic line anywhere between the master cylinder and the one-way cylinder to reduce the pulsing effect on the brake lever.

12. The antilock brake system of claim 10, further comprising:
    a lockout mechanism to turn on and off the actuator assembly.

13. The antilock brake system of claim 7, further comprising:
    a retract mechanism that lifts the cam follower off the cam when there is no braking.

14. An antilock brake system for vehicles with hydraulic brakes comprising:
    a brake lever connected to a hydraulic master cylinder;
    a brake rotor coupled to a wheel of a vehicle, wherein said brake rotor comprises a plurality of alternating high and low segments on its circumference to form a cam;
    a hydraulic brake caliper with a brake pad for contacting the brake rotor;
    a one-way cylinder with a piston, said one-way cylinder coupled to a hydraulic line between said master cylinder and said hydraulic brake caliper; and a cam follower coupled to said piston and positioned for direct contact with said circumference of said brake rotor, wherein rotation of said brake rotor about its axis causes said cam follower to drive said piston in a back and forth motion during said contact with said brake rotor upon activation of the brake lever thereby creating a pulsing effect on said hydraulic brake caliper.

15. The antilock brake system of claim 14, further comprising:
an orifice placed in the hydraulic line anywhere between the master cylinder and the one-way cylinder to reduce the pulsing effect on the brake lever.

16. The antilock brake system of claim 14, further comprising:
a lockout mechanism to turn on and off the actuator assembly.

17. The antilock brake system of claim 14, further comprising:
a retract mechanism that lifts the cam follower off the cam when there is no braking.

\* \* \* \* \*